United States Patent
Tange et al.

(10) Patent No.: US 6,970,777 B2
(45) Date of Patent: Nov. 29, 2005

(54) AUTOMOTIVE LANE DEVIATION PREVENTION APPARATUS

(75) Inventors: Satoshi Tange, Kanagawa (JP); Shinji Matsumoto, Kanagawa (JP); Masayasu Shimakage, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/994,319

(22) Filed: Nov. 23, 2004

(65) Prior Publication Data

US 2005/0113999 A1   May 26, 2005

(30) Foreign Application Priority Data

Nov. 26, 2003   (JP)   ............... 2003-395587

(51) Int. Cl.$^7$ .............................................. G06F 7/00
(52) U.S. Cl. .......................................... 701/41; 701/70
(58) Field of Search ............................... 701/41, 70, 77, 701/210, 301; 382/104, 168, 272; 180/167, 180/168; 340/435, 436, 933–937, 907; 303/125

(56) References Cited

U.S. PATENT DOCUMENTS

| | | | |
|---|---|---|---|
| 6,370,471 B1 | | 4/2002 | Lohner et al. |
| 6,487,501 B1 * | | 11/2002 | Jeon ........................... 701/301 |
| 6,708,098 B2 * | | 3/2004 | Matsumoto et al. .......... 701/70 |
| 6,732,021 B2 * | | 5/2004 | Matsumoto et al. ........... 701/1 |
| 6,792,345 B2 * | | 9/2004 | Matsumoto et al. .......... 701/96 |
| 6,834,254 B2 * | | 12/2004 | Sekiguchi ................... 702/158 |
| 6,850,629 B2 * | | 2/2005 | Jeon ........................... 382/104 |
| 2002/0087255 A1 | | 7/2002 | Jindo et al. |

FOREIGN PATENT DOCUMENTS

| | | |
|---|---|---|
| DE | 100 17 279 A1 | 10/2000 |
| EP | 1 251 051 A1 | 10/2002 |
| JP | 11-96497 A | 4/1999 |
| JP | 2000-33860 A | 2/2000 |
| WO | WO 03/059680 A1 | 7/2003 |
| WO | WO 03/064237 A1 | 8/2003 |

\* cited by examiner

Primary Examiner—Richard M. Camby
(74) Attorney, Agent, or Firm—Foley and Lardner

(57) ABSTRACT

In an automotive lane deviation prevention (LDP) apparatus capable of executing LDP control by which a host vehicle is avoided from deviating from a driving lane, a control unit includes an LDP control allotted amount calculation section that calculates, responsively to a host vehicle's turning state, a steering-control allotted amount for LDP control and a braking-force-control allotted amount for LDP control, in presence of the host vehicle's lane-deviation tendency from the driving lane. In order to avoid the host vehicle's lane-deviation tendency, steering torque is controlled responsively to a steering-torque-control controlled variable determined based on the steering-control allotted amount, whereas braking forces applied to respective road wheels are controlled responsively to braking-force-control controlled variables determined based on the braking-force-control allotted amount.

19 Claims, 12 Drawing Sheets

AUTOMOTIVE LANE DEVIATION PREVENTION APPARATUS

TECHNICAL FIELD

The present invention relates to an automotive lane deviation prevention (LDP) apparatus, and specifically to the improvement of an automatic lane deviation prevention control technology capable of preventing a host vehicle from deviating from its driving lane even when the host vehicle tends to deviate from the driving lane.

BACKGROUND ART

In recent years, there have been proposed and developed various automatic lane deviation prevention control technologies and vehicle dynamics control technologies. On automotive vehicles having both the vehicle dynamics control (VDC) function and lane deviation prevention (LDP) function, generally, there are two types of lane deviation prevention control, namely, an LDP control system using a steering actuator and an LDP control system using braking force actuators. In the steering-actuator equipped LDP control system, lane deviation is prevented by producing a yaw moment by way of steering-torque control whose controlled variable is determined depending on a host vehicle's lateral displacement or a host vehicle's lateral deviation from a central axis (a reference axis) of the current host vehicle's driving lane. One such steering-actuator equipped LDP control system has been disclosed in Japanese Patent Provisional Publication No. 11-96497 (hereinafter is referred to as "JP11-96497"). On the other hand, in the braking-force-actuator equipped LDP control system, lane deviation is prevented by producing a yaw moment by controlling braking force actuators, such as an ABS-system hydraulic modulator, depending on a host vehicle's lateral deviation from a central axis of the current host vehicle's driving lane. Usually, in order to produce the yaw moment for lane deviation avoidance, braking forces are applied to the road wheels opposite to the direction that the lane deviation occurs. One such braking-force-actuator equipped LDP control system has been disclosed in Japanese Patent Provisional Publication No. 2000-33860 (hereinafter is referred to as JP2000-33860).

SUMMARY OF THE INVENTION

However, in case of the steering-actuator equipped LDP control system disclosed in JP11-96497, when the host vehicle tends to deviate from the central axis of the driving lane, while causing the front road wheels to move toward the outside of a turn, a yaw moment required for lane deviation avoidance is produced by way of the steering-torque control. Owing to the yaw moment produced in accordance with the steering-torque control, there is an increased tendency for a lateral acceleration (lateral G) exerted on the vehicle to undesirably increase. This results in unnatural feeling that the driver experiences uncomfortable changes or uncomfortable fluctuations in dynamic vehicle behavior, such as a remarkable increase in lateral G.

Conversely in case of the braking-force-actuator equipped LDP control system disclosed in JP2000-33860, when the host vehicle tends to deviate from the driving lane during straight-ahead driving, a yaw moment required for lane deviation avoidance is produced by way of braking force application to the road wheels. As a result of such braking force application, the braking-force-actuator equipped LDP control system tends to give a feeling of uncomfortable vehicle deceleration to the driver. Actually, each of steering-torque control executed by the steering-actuator equipped LDP control system and braking force control executed by the braking-force-actuator equipped LDP control system must be achieved within limits. Thus, in order to more greatly enhance or improve a lane-deviation-prevention (LDP) performance, it would be desirable to optimize a control allotment rate between steering-torque control executed by the steering-actuator equipped LDP control system and braking force control executed by the braking-force-actuator equipped LDP control system during lane-deviation-prevention control.

Accordingly, it is an object of the invention to provide an automotive lane deviation prevention (LDP) apparatus capable of executing LDP control without any unnatural feeling that the driver experiences uncomfortable changes or uncomfortable fluctuations in dynamic vehicle behavior, such as a remarkable increase in lateral G or uncomfortable vehicle deceleration, irrespective of a lane-deviation state of a host vehicle.

In order to accomplish the aforementioned and other objects of the present invention, an automotive lane deviation prevention apparatus comprises an automotive lane deviation prevention apparatus capable of executing lane deviation prevention (LDP) control by which a host vehicle is avoided from deviating from a driving lane, the LDP apparatus comprising a traveling-state detector that detects a traveling state of the host vehicle, a steering actuator that adjusts a steering torque applied to a steering system, braking force actuators that adjust braking forces applied to respective road wheels for adjusting a yaw moment exerted on the host vehicle, and a control unit being configured to be electronically connected to the steering actuator, the braking force actuators and the traveling-state detector, for controlling the steering actuator and the braking force actuators in response to signals from the traveling-state detector for lane deviation avoidance purposes; the control unit comprising an LDP control allotted amount calculation section that determines, responsively to the host vehicle's traveling state, whether there is a tendency for the host vehicle to deviate from the driving lane, and calculates, responsively to the host vehicle's traveling state, a steering-control allotted amount for the LDP control and a braking-force-control allotted amount for the LDP control, in presence of the host vehicle's lane-deviation tendency from the driving lane, a steering-control controlled variable calculation section that calculates a steering-torque-control controlled variable based on the steering-control allotted amount for producing the steering torque in a direction that the host vehicle's lane-deviation tendency is avoided, a steering torque control section that controls the steering torque responsively to the steering-torque-control controlled variable, a desired yaw-moment calculation section that calculates a desired yaw moment based on the braking-force-control allotted amount for producing the yaw moment in the direction that the host vehicle's lane-deviation tendency is avoided, a braking-force-control controlled variable calculation section that calculates, based on the desired yaw moment, braking-force-control controlled variables for the respective road wheels, and a braking force control section that controls the braking forces applied to the respective road wheels responsively to the braking-force-control controlled variables.

According to another aspect of the invention, an automotive lane deviation prevention apparatus capable of executing lane deviation prevention (LDP) control by which a host vehicle is avoided from deviating from a driving lane, the LDP apparatus comprises a traveling-state detector that detects a traveling state of the host vehicle, a steering actuator that adjusts a steering torque applied to a steering system, braking force actuators that adjust braking forces applied to respective road wheels for adjusting a yaw moment exerted on the host vehicle, and a control unit being configured to be electronically connected to the steering actuator, the braking force actuators and the traveling-state detector, for controlling the steering actuator and the braking force actuators in response to signals from the traveling-state detector for lane deviation avoidance purposes, the control unit comprising lane-deviation decision means for determining, responsively to the host vehicle's traveling state, whether there is a tendency for the host vehicle to deviate from the driving lane, lane-deviation-avoidance allotted amount calculation means for calculating, responsively to the host vehicle's traveling state, a steering-control allotted amount for the LDP control and a braking-force-control allotted amount for the LDP control, in presence of the host vehicle's lane-deviation tendency from the driving lane, steering-control controlled variable calculation section for calculating a steering-torque-control controlled variable based on the steering-control allotted amount for producing the steering torque in a direction that the host vehicle's lane-deviation tendency is avoided, steering torque control means for controlling the steering torque responsively to the steering-torque-control controlled variable, desired yaw-moment calculation means for calculating a desired yaw moment based on the braking-force-control allotted amount for producing the yaw moment in the direction that the host vehicle's lane-deviation tendency is avoided, braking-force-control controlled variable calculation means for calculating, based on the desired yaw moment, braking-force-control controlled variables for the respective road wheels, and braking force control means for controlling the braking forces applied to the respective road wheels responsively to the braking-force-control controlled variables.

According to another aspect of the invention, a method for lane deviation prevention (LDP) control by which a host vehicle is avoided from deviating from a driving lane, the method comprises detecting a traveling state of the host vehicle, determining, responsively to the host vehicle's traveling state, whether there is a tendency for the host vehicle to deviate from the driving lane, calculating, responsively to the host vehicle's traveling state, a steering-control allotted amount for the LDP control and a braking-force-control allotted amount for the LDP control, in presence of the host vehicle's lane-deviation tendency from the driving lane, calculating a steering-torque-control controlled variable based on the steering-control allotted amount for producing the steering torque in a direction that the host vehicle's lane-deviation tendency is avoided, controlling, responsively to the steering-torque-control controlled variable, a steering torque applied to a steering system, calculating a desired yaw moment based on the braking-force-control allotted amount for producing a yaw moment acting on the host vehicle in the direction that the host vehicle's lane-deviation tendency is avoided, calculating, based on the desired yaw moment, braking-force-control controlled variables for respective road wheels, and controlling, responsively to the braking-force-control controlled variables, braking forces applied to the respective road wheels.

The other objects and features of this invention will become understood from the following description with reference to the accompanying drawings.

DESCRIPTION OF THE PREFERRED EMBODIMENTS

Figure 1:
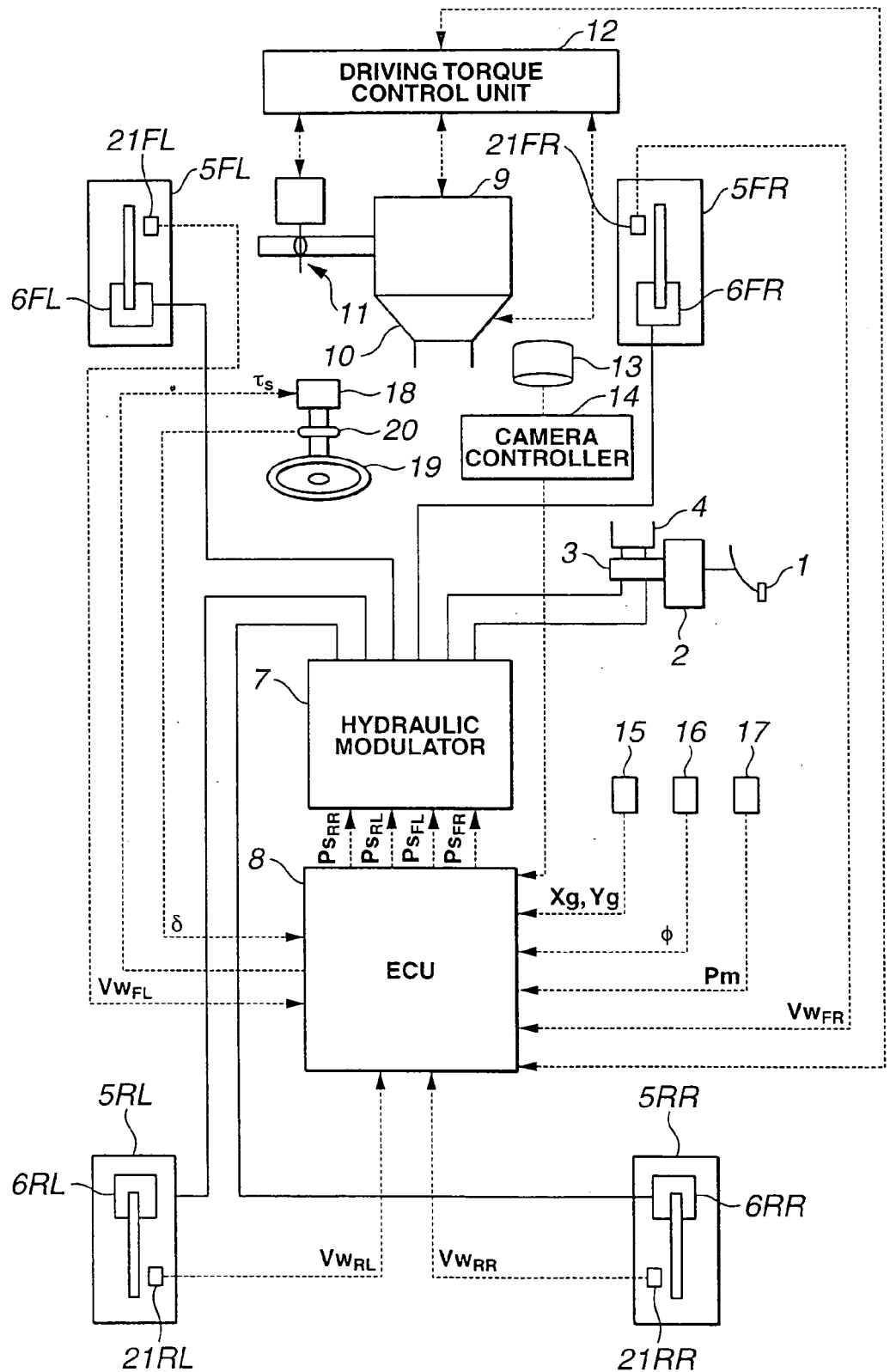
FIG. 1 is a system block diagram illustrating an embodiment of an automotive lane deviation prevention (LDP) apparatus.

Referring now to the drawings, particularly to FIG. 1, the lane deviation prevention (LDP) apparatus of the embodiment is exemplified in an adaptive cruise control (ACC) system equipped rear-wheel-drive vehicle employing an automatic transmission 10 and a rear differential. In the LDP apparatus of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators (braking force actuators) respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL–6RR in response to the command signal from the output interface of ECU 8, regardless of the braking action (brake-pedal depression) manually created by the driver's foot.

The ACC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

A steering-torque actuator 18, simply a steering actuator, is provided to apply a steering torque to a steering linkage. The magnitude of the applied steering torque is controlled in response to a steering-torque command input from ECU 8 into steering actuator 18.

The ACC system equipped rear-wheel-drive vehicle of the embodiment of FIG. 1 also includes an external recognizing detector (13, 14), which functions to detect the current position information of the ACC system equipped vehicle (the host vehicle) within the driving lane (the host vehicle's traffic lane) and whose sensor signal is used for detecting whether or not the host vehicle tends to deviate from the current driving lane. A stereocamera with a charge-coupled device (CCD) image sensor, simply, a charge-coupled device (CCD) camera (a picture image pick-up device) 13 and a camera controller (serving as a lane marking line detector) 14 are used as the external recognizing detector (13, 14). Within camera controller 14, on the basis of an image-processing picture image data in front of the host vehicle and captured by CCD camera 13, a lane marker or lane marking (or a white lane marking line by which two adjacent lanes are divided), such as a white line, is detected and thus the current host vehicle's traffic lane, exactly, the current position information of the host vehicle within the driving lane, is determined based on the white lane marking line detected. The processor of camera controller 14 calculates and determines or estimates, based on the image data from CCD camera 13 indicative of the picture image, a host vehicle's yaw angle $\Phi$ with respect to the sense of the current host vehicle's driving lane, a host vehicle's lateral displacement X from a central axis (a reference axis) of the current host vehicle's driving lane, a curvature $\beta$ of the current host vehicle's driving lane, and a lane width L of the current host vehicle's driving lane.

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters $\Phi$, X, $\beta$, and L calculated by camera controller 14, and the signal indicative of a driving torque, controlled and produced by driving-torque control unit 12, the input/output interface (I/O) of ECU 8 receives input information from various engine/vehicle sensors, such as an acceleration sensor (G sensor) 15, a yaw rate sensor 16, a master-cylinder pressure sensor 17, a steer angle sensor 20, and front-left, front-right, rear-left, and rear-right wheel speed sensors 21FL, 21FR, 21RL, and 21RR. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle. Yaw rate sensor 16 is provided to detect a yaw rate $\phi$ (one of the host vehicle's driving states) resulting from a yaw moment acting on the host vehicle. Master-cylinder pressure sensor 17 is provided to detect a master-cylinder pressure Pm of master cylinder 3, that is, the amount of depression of brake pedal 1. Steer angle sensor 20 is provided to detect or estimate a steer angle $\delta$ based on a steering wheel angle of a steering wheel 19. Front-left, front-right, rear-left, and rear-right wheel speed sensors 21FL, 21FR, 21RL, and 21RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwj". Within the ACC system, these input informational data are used for collision avoidance control as well as lane deviation prevention control (or vehicle yawing motion control). The previously-noted CCD camera 13 and camera controller 14 function as an external recognizing detector or a lane marking line detector or a host vehicle's driving lane detector or a traveling-path condition detector, which detects a condition of the path where the host vehicle is traveling. In the presence of a directionality or polarity concerning left or right directions of each of the vehicle driving state indicative data and the traveling-path condition indicative data, which are collectively referred to as "host vehicle's traveling state", namely, yaw rate φ, lateral acceleration Yg, steer angle δ, yaw angle Φ, and lateral displacement X, a change in the vehicle driving state indicative data to the left is indicated as a positive value, while a change in the vehicle driving state indicative data to the right is indicated as a negative value. More concretely, during a left turn, yaw rate φ, lateral acceleration Yg, steer angle δ, and yaw angle Φ are all indicated as positive values. Conversely during a right turn, these parameters φ, Yg, δ, and Φ are all indicated as negative values. On the other hand, lateral displacement X is indicated as a positive value when the host vehicle is deviated from the central axis of the current driving lane to the left. Conversely when the host vehicle is deviated from the central axis of the current driving lane to the right, lateral displacement X is indicated as a negative value. Within ECU 8, the central processing unit (CPU) allows the access by the I/O interface of input informational data signals from the previously-discussed engine/vehicle sensors and camera controller 14 and driving torque control unit 12, and is responsible for carrying various control programs stored in the memories and capable of performing necessary arithmetic and logic operations (described later in reference to FIGS. 2 and 3), when there is a possibility of the host vehicle's lane deviation. Computational results or arithmetic calculation results, in other words, calculated output signals or control command signals are relayed via the output interface circuitry to the output stages, for example, the solenoids of hydraulic modulator 7 and steering actuator 18.

Figure 2:
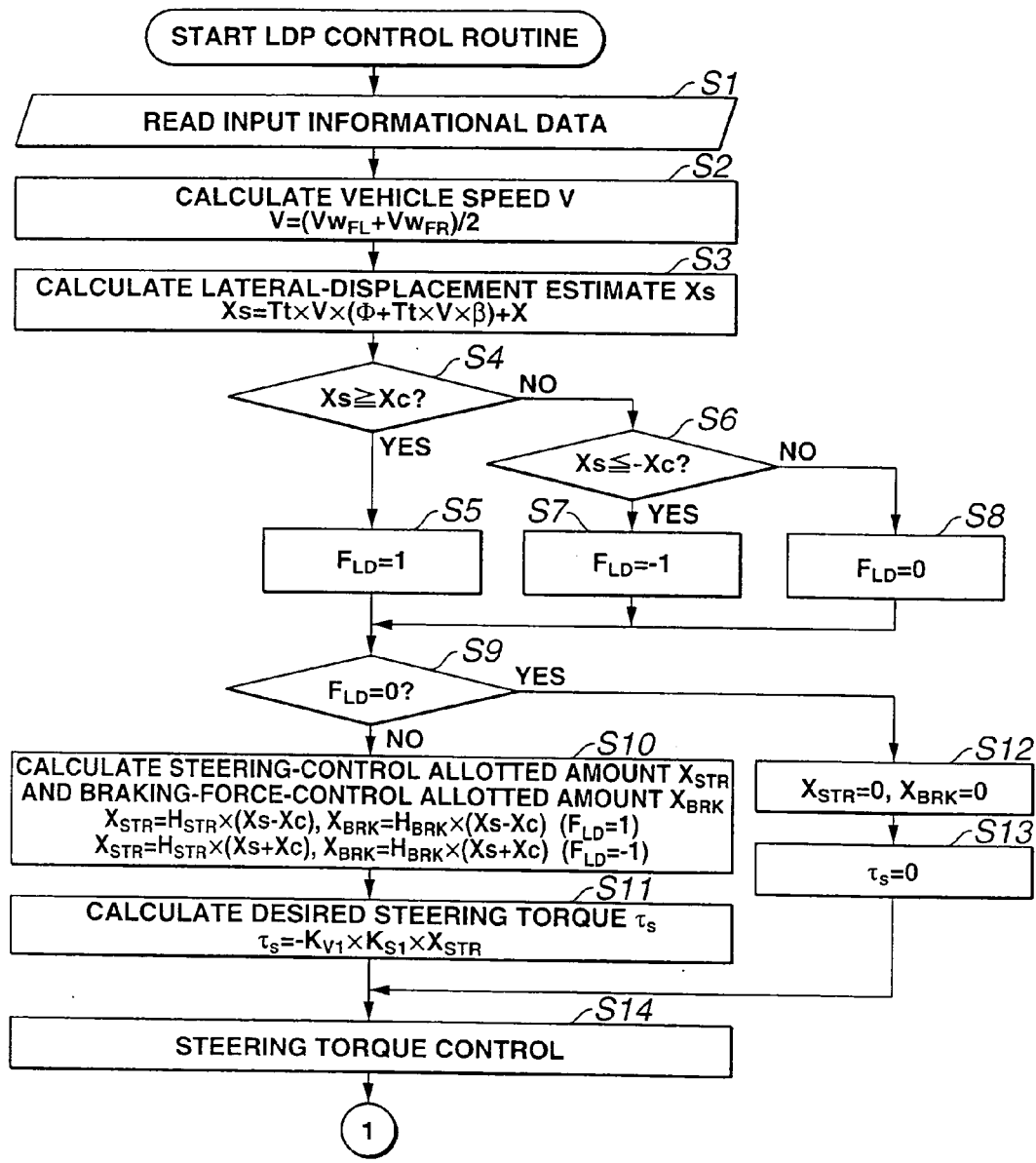
FIG. 2 is a flow chart showing a former half of an LDP control routine executed within an electronic control unit (ECU) incorporated in the LDP apparatus of the embodiment of FIG. 1.
Figure 3:
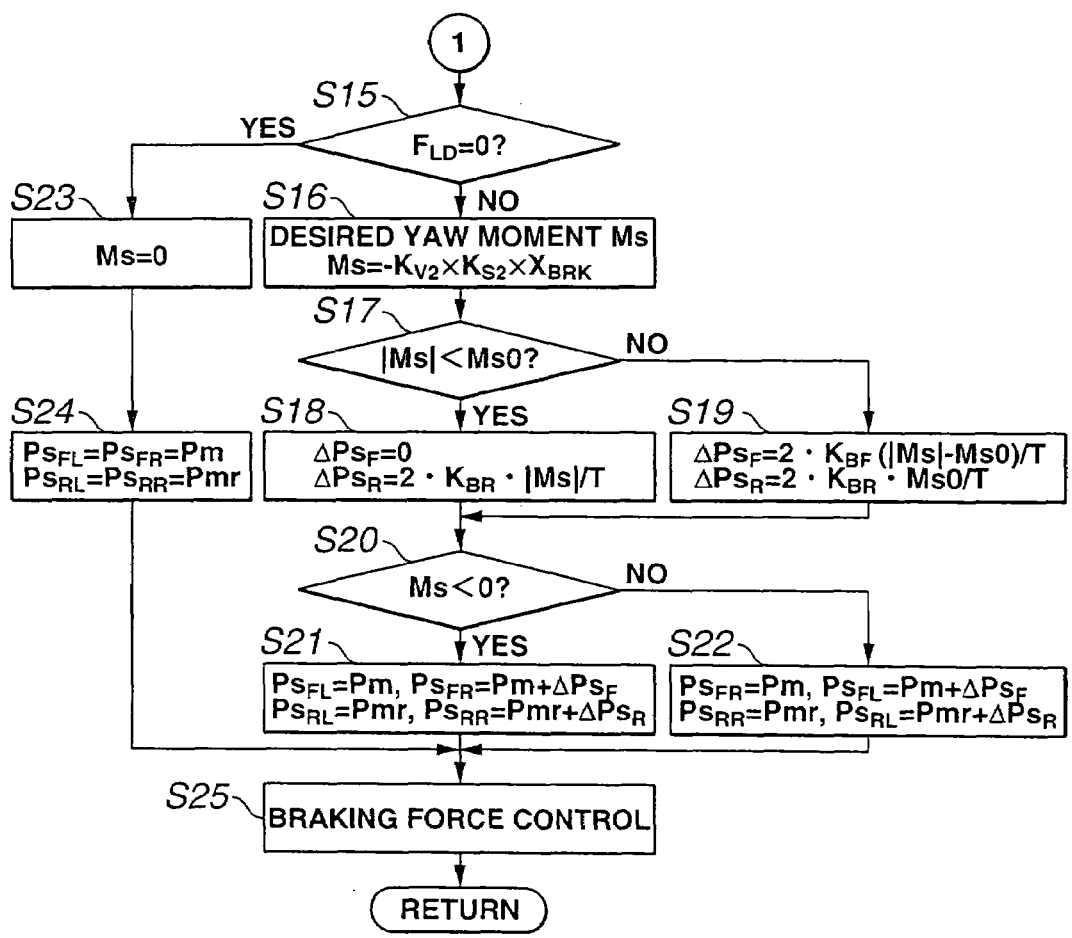
FIG. 3 is a flow chart showing a latter half of the LDP control routine executed within the ECU of the LDP apparatus of the embodiment of FIG. 1.

The LDP control routine executed by ECU 8 incorporated in the automotive LDP apparatus of the embodiment shown in FIG. 1 is hereunder described in detail in reference to the flow charts shown in FIGS. 2 and 3. FIG. 2 shows the former half of the LDP control routine executed within the ECU incorporated in the LDP apparatus of the embodiment of FIG. 1. On the other hand, FIG. 3 shows the latter half of the LDP control routine executed within the ECU incorporated in the LDP apparatus of the embodiment of FIG. 1. The latter half (a braking-force-control routine for lane deviation avoidance) of the LDP routine shown in FIG. 3 is common to each of the LDP apparatus of the first modified LDP apparatus described later in reference to the flow chart shown in FIG. 7, the second modified LDP apparatus described later in reference to the flow chart shown in FIG. 10, and the third modified LDP apparatus described later in reference to the flow chart shown in FIG. 12. The LDP control routine of FIGS. 2–3 is executed as time-triggered interrupt routines to be triggered every predetermined sampling time intervals ΔT such as 10 milliseconds.

At step S1 of FIG. 2, input informational data from the previously-noted engine/vehicle sensors, and driving-torque controller 12 and camera controller 14 are read. Concretely, read are engine/vehicle sensor signal data, such as the host vehicle's lateral acceleration Yg, wheel speeds Vwj ($Vw_{FL}$, $Vw_{FR}$, $Vw_{RL}$, $Vw_{RR}$), master-cylinder pressure Pm, steer angle δ, and signal data from driving-torque control unit 12 such as driving torque, and signal data from camera controller 14 such as the host vehicle's yaw angle Φ with respect to the direction of the current host vehicle's driving lane, lateral displacement X from the central axis of the current host vehicle's driving lane, and the host vehicle's driving-lane curvature β.

At step S2, a host vehicle's speed V is calculated. Concretely, host vehicle speed V is calculated as a simple average value $(Vw_{FL}+Vw_{FR})/2$ of front-left and front-right wheel speeds $Vw_{FL}$ and $Vw_{FR}$ (corresponding to wheel speeds of driven road wheels 5FL and 5FR), from the following expression (1).

$$V=(Vw_{FL}+Vw_{FR})/2 \qquad (1)$$

At step S3, a lateral-displacement estimate Xs, in other words, an estimate of a future lateral deviation or an estimate of a future lateral displacement, is estimated or arithmetically calculated. Actually, lateral-displacement estimate Xs is estimated or arithmetically calculated based on the latest up-to-date information concerning the host vehicle's yaw angle Φ with respect to the direction of the current host vehicle's driving lane (in other words, the orientation of the host vehicle with respect to the direction of the current host vehicle's driving lane), lateral displacement X from the central axis of the current host vehicle's driving lane, curvature β of the current host vehicle's driving lane, and the host vehicle's speed V $(=(Vw_{FL}+Vw_{FR})/2)$, from the following expression (2).

$$Xs=Tt \times V \times (\Phi+Tt \times V \times \beta)+X \qquad (2)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as a future lateral-displacement estimate Xs. As described later in reference to step S4 of FIG. 2, in the LDP apparatus of the embodiment of FIG. 1, when the absolute value |Xs| of lateral-displacement estimate Xs becomes greater than or equal to a predetermined lateral-displacement criterion Xc, that is, in case of |Xs|≧Xc, ECU 8 determines that there is an increased tendency of lane deviation of the host vehicle from the current driving lane.

At step S4, a check is made to determine, based on a comparison result of lateral-displacement estimate Xs (calculated through step S3) and predetermined lateral-displacement criterion Xc, whether there is a possibility or an increased tendency of lane deviation of the host vehicle from the current driving lane. For instance, predetermined lateral-displacement criterion Xc is set to 0.8 meter, since a width of a traffic lane of an express-highway in Japan is 3.35 meters. In case of Xs≧Xc, ECU 8 determines that there is an increased tendency of lane deviation of the host vehicle from the current driving lane to the left, and thus the routine proceeds from step S4 to step S5. At step S5, a lane-deviation decision flag $F_{LD}$ is set to "1", exactly, "+1". After step S5, step S9 occurs. On the contrary, in case of Xs<Xc, the routine proceeds from step S4 to step S6. At step S6, another check is made to determine whether lateral-displacement estimate Xs is less than or equal to a negative value −Xc of predetermined lateral-displacement criterion Xc. In case of Xs≦-Xc, ECU 8 determines that there is an increased tendency for the host vehicle to deviate from the current driving lane to the right, and thus the routine proceeds from step S6 to step S7. At step S7, lane-deviation decision flag $F_{LD}$ is set to "-1". Thereafter, the routine flows from step S7 to step S9. Alternatively, when the condition defined by Xs≧Xc and Xs≦-Xc are both unsatisfied, that is to say, in case of -Xc<Xs<Xc, ECU 8 determines that there is a less possibility of the host vehicle's lane deviation from the current driving lane to the right or to the left, and thus the routine flows from step S4 via step S6 to step S8. At step S8 lane-deviation decision flag $F_{LD}$ is reset to "0", and thereafter the routine advances to step S9.

At step S9, a check is made to determine whether lane-deviation decision flag $F_{LD}$ is reset to "0". When lane-deviation decision flag $F_{LD}$ is not reset to "0", that is, in case of $F_{LD} \neq 0$, the routine proceeds from step S9 to step S10.

At step S10, a steering-control allotted amount $X_{STR}$ (corresponding to a controlled variable for steering torque control executed for lane deviation avoidance) and a braking-force-control allotted amount $X_{BRK}$ (corresponding to a controlled variable for braking force control executed for lane deviation avoidance) are arithmetically calculated. Under a specific condition defined by $F_{LD}=1$, in other words, in presence of the host vehicle's lane-deviation tendency to the left, steering-control allotted amount $X_{STR}$ and braking-force-control allotted amount $X_{BRK}$ are calculated from the following expression (3). Under a specific condition defined by $F_{LD}=-1$, in other words, in presence of the host vehicle's lane-deviation tendency to the right, steering-control allotted amount $X_{STR}$ and braking-force-control allotted amount $X_{BRK}$ are calculated from the following expression (4).

$$X_{STR}=H_{STR} \times (Xs-Xc), X_{BRK}=H_{BRK} \times (Xs-Xc) \quad (3)$$

$$X_{STR}=H_{STR} \times (Xs+Xc), X_{BRK}=H_{BRK} \times (Xs+Xc) \quad (4)$$

where $H_{STR}$ denotes a steering-control allotted ratio, $H_{BRK}$ denotes a braking-force-control allotted ratio, the summed value ($H_{STR}+H_{BRK}$) of steering-control allotted ratio $H_{STR}$ and braking-force-control allotted ratio $H_{BRK}$ is "1".

Figure 4:
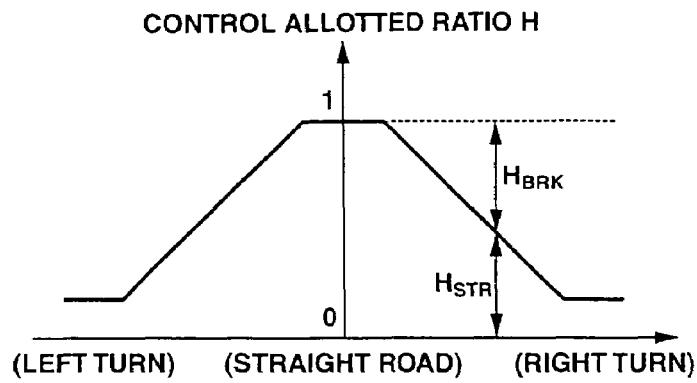
FIG. 4 is a preprogrammed driving-lane curvature $\beta$ versus control allotted ratio H characteristic map.

Steering-control allotted ratio $H_{STR}$ and braking-force-control allotted ratio $H_{BRK}$ are set or determined depending on the host vehicle's turning state. Actually, in the LDP apparatus of the embodiment of FIG. 1, steering-control allotted ratio $H_{STR}$ and braking-force-control allotted ratio $H_{BRK}$ are computed or retrieved based on driving-lane curvature β from the predetermined driving-lane curvature β versus control allotted ratio H characteristic map shown in FIG. 4. In FIG. 4, the right turn means a rightward curved road, whereas the left turn means a leftward curved road. As can be seen from the predetermined driving-lane curvature β versus control allotted ratio H characteristic map of FIG. 4, the gentler a curve that the vehicle is going around, in other words, the smaller the driving-lane curvature β, the greater the steering-control allotted ratio $H_{STR}$ that can be map-retrieved from the control allotted ratio H characteristic map of FIG. 4. The steeper a curve that the vehicle is going around, in other words, the greater the driving-lane curvature β, the greater the braking-force-control allotted ratio $H_{BRK}$ that can be map-retrieved from the control allotted ratio H characteristic map of FIG. 4.

At step S11, a desired value (a desired steering torque τS) of steering torque to be produced by steering actuator 18 during steering control for lane deviation avoidance is arithmetically calculated from the following expression (5). After step S11, step S14 occurs.

$$\tau s = -K_{V1} \times K_{S1} \times X_{STR} \quad (5)$$

where $K_{V1}$ denotes a constant that is determined by specifications of the host vehicle, and $K_{S1}$ denotes a variable gain that is determined depending on host vehicle speed V.

In contrast to the above, under a specific condition defined by $F_{LD}=0$, in other words, in absence of the host vehicle's lane-deviation tendency to the right or to the left, the routine proceeds from step S9 to step S12. At step S12, steering-control allotted amount $X_{STR}$ and braking-force-control allotted amount $X_{BRK}$ are calculated from the following expression (6), and both set to "0". After step S12, step S13 occurs. At step S13, desired steering torque τs is calculated from the following expression (7), and thus set to "0". After step S13, step S14 occurs.

$$X_{STR}=0, X_{BRK}=0 \quad (6)$$

$$\tau s=0 \quad (7)$$

At step S14, steering torque control is executed so that the actual steering torque generated by steering actuator 18 is brought closer to the desired steering torque TS calculated through steps S11 or S13.

After step S14 of FIG. 2, the latter half of the LDP control routine shown in FIG. 3 is initiated. The former half of the LDP control routine shown in FIG. 2 corresponds to the steering-control routine for lane deviation avoidance, whereas the latter half of the LDP control routine shown in FIG. 3 corresponds to the braking-force-control routine for lane deviation avoidance.

At step S15 of FIG. 3, a check is made to determine whether lane-deviation decision flag $F_{LD}$ is reset to "0". When lane-deviation decision flag $F_{LD}$ is not reset to "0", that is, in case of $F_{LD} \neq 0$, the routine proceeds from step S15 to step S16.

At step S16, a desired value (a desired yaw moment Ms) of yaw moment to be exerted on the host vehicle and produced via hydraulic modulator 7 during braking force control for lane deviation avoidance is arithmetically calculated. Concretely, desired yaw moment Ms is arithmetically calculated, based on braking-force-control allotted amount $X_{BRK}$ calculated through step S10 of FIG. 2, from the following expression (8).

$$Ms=-K_{V2} \times K_{S2} \times X_{BRK} \quad (8)$$

where $K_{V2}$ denotes a constant that is determined by specifications of the host vehicle, and $K_{S2}$ denotes a variable gain that is determined depending on host vehicle speed V.

Thereafter, front-left, front-right, rear-left, and rear-right desired wheel-brake cylinder pressures $Ps_{FL}$, $Ps_{FR}$, $Ps_{RL}$ and $Ps_{RR}$, which are collectively referred to as "Ps", are calculated and determined based on desired yaw moment Ms determined through step S16, depending on whether the absolute value |Ms| of desired yaw moment Ms is less than a predetermined yaw-moment threshold value, simply a preset value Ms0. Concretely, in case of |Ms|<Ms0, the processor of ECU 8 determines each of desired wheel-brake cylinder pressures $Ps_{FL}$ to $Ps_{RR}$ in such a manner as to provide only the differential pressure between rear road wheels 5RL and 5RR. In this case, the differential pressure between front road wheels 5FL and 5FR is set to "0".

At step S17 occurring after step S16, a check is made to determine whether the absolute value |Ms| of desired yaw moment Ms is less than preset value Ms0. In case of |Ms|<Ms0, the routine proceeds from step S17 to step S18.

At step S18, under a specific condition defined by |Ms|<Ms0, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are calculated or determined from the following expressions (9) and (10).

$$\Delta Ps_F = 0 \tag{9}$$

$$\Delta Ps_R = 2 \times K_{BR} \times |Ms|/T \tag{10}$$

where $K_{BR}$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |Ms| of desired yaw moment Ms is greater than or equal to preset value Ms0, (i.e., |Ms|≧Ms0), the routine advances from step S17 to step S19, and the processor of ECU 8 determines each of desired wheel-brake cylinder pressures $Ps_{FL}$ to $Ps_{RR}$ in such a manner as to provide both of the differential pressure between front road wheels 5FL and 5FR and the differential pressure between rear road wheels 5RL and 5RR.

At step S19, front and rear desired wheel-brake cylinder pressure differences $\Delta Ps_F$ and $\Delta Ps_R$ are represented by the following expressions (11) and (12).

$$\Delta Ps_F = 2 \times K_{BF} \times (|Ms|-Ms0)/T \tag{11}$$

$$\Delta Ps_R = 2 \times K_{BR} \times Ms0/T \tag{12}$$

where $K_{BF}$ denotes a predetermined conversion coefficient used to convert a front-wheel braking force into a front wheel-brake cylinder pressure, $K_{BR}$ denotes a predetermined conversion coefficient used to convert a rear-wheel braking force into a rear wheel-brake cylinder pressure, T of the expression (11) and T of the expression (12) denote front and rear wheel treads being the same in front and rear wheels, and Ms0 denotes the preset value (i.e., the predetermined desired yaw-moment threshold value).

At step S20, a check is made to determine whether desired yaw moment Ms is a negative value (Ms<0), in other words, the host vehicle tends to deviate from the current driving lane to the left. In case of Ms<0, the routine proceeds from step S20 to step S21.

At step S21, in order to produce the component of yaw moment vector needed to rotate the host vehicle to the right, front-left desired wheel-brake cylinder pressure $Ps_{FL}$ is set to master-cylinder pressure Pm, front-right desired wheel-brake cylinder pressure $Ps_{FR}$ is set to the sum (Pm+$\Delta Ps_F$) of master-cylinder pressure Pm and front desired wheel-brake cylinder pressure difference $\Delta Ps_F$, rear-left desired wheel-brake cylinder pressure $Ps_{RL}$ is set to a rear-wheel master-cylinder pressure Pmr, which is calculated and usually reduced from master-cylinder pressure Pm, while taking into account wheel-brake cylinder pressure distribution between front and rear wheel brakes, and rear-right desired wheel-brake cylinder pressure $Ps_{RR}$ is set to the sum (Pmr+$\Delta Ps_R$) of rear-wheel master-cylinder pressure Pmr and rear desired wheel-brake cylinder pressure difference $\Delta Ps_R$ (see the following expressions (13)–(16)).

$$Ps_{FL}=Pm \tag{13}$$

$$Ps_{FR}=Pm+\Delta Ps_F \tag{14}$$

$$Ps_{RL}=Pmr \tag{15}$$

$$Ps_{RR}=Pmr+\Delta Ps_R \tag{16}$$

On the contrary, when desired yaw moment Ms is a positive value (Ms≧0), in other words, the host vehicle tends to deviate from the current driving lane to the right, the routine proceeds from step S20 to step S22.

At step S22, in order to produce the component of yaw moment vector needed to rotate the host vehicle to the left, front-left desired wheel-brake cylinder pressure $Ps_{FL}$ is set to the sum (Pm+$\Delta Ps_F$) of master cylinder pressure Pm and front desired wheel-brake cylinder pressure difference $\Delta Ps_F$, front-right desired wheel-brake cylinder pressure $Ps_{FR}$ is set to master cylinder pressure Pm, rear-left desired wheel-brake cylinder pressure $Ps_{RL}$ is set to the sum (Pmr+$\Delta Ps_R$) of rear-wheel master-cylinder pressure Pmr and rear desired wheel-brake cylinder pressure difference $\Delta Ps_R$, and rear-right desired wheel-brake cylinder pressure $Ps_{RR}$ is set to rear-wheel master-cylinder pressure Pmr (see the following expressions (17)–(20)).

$$Ps_{FL}=Pm+\Delta Ps_F \tag{17}$$

$$Ps_{FR}=Pm \tag{18}$$

$$Ps_{RL}=Pmr+\Delta Ps_R \tag{19}$$

$$Ps_{RR}=Pmr \tag{20}$$

Conversely when lane-deviation decision flag $F_{LD}$ is reset to "0", that is, in case of $F_{LD}$=0, the routine proceeds from step S15 to step S23.

At step S23, desired yaw moment Ms is arithmetically calculated from the following expression (21).

$$Ms=0 \tag{21}$$

At step S24 occurring after step S23, front-left and front-right desired wheel-brake cylinder pressures $Ps_{FL}$ and $Ps_{FR}$ are both set to master cylinder pressure Pm, and rear-left and rear-right desired wheel-brake cylinder pressures $Ps_{RL}$ and $Ps_{RR}$ are both set to rear-wheel master-cylinder pressure Pmr (see the following expressions (22)–(23)).

$$Ps_{FL}=Ps_{FR}=Pm \tag{22}$$

$$Ps_{RL}=Ps_{RR}=Pmr \tag{23}$$

After steps S21, S22, and S24, step S25 occurs.

At step S25, braking force control is executed so that the actual wheel-brake cylinder pressures of wheel-brake cylinders 6FR, 6FL, 6RL, and 6RR, adjusted by means of hydraulic modulator 7 are brought closer to the respective desired wheel-brake cylinder pressures $Ps_{FL}$, $Ps_{FR}$, $Ps_{RL}$, and $Ps_{RR}$, calculated through steps S21, S22 or S24.

In the previously-discussed LDP control routine shown in FIGS. 2 and 3, and executed within the ECU of the embodiment of FIG. 1, steps S3–S8 of FIG. 2 serve as a lane-deviation decision means. Steps S10 and S12 serve as a lane-deviation-avoidance (LDA) allotted amount calculation means for calculating both of steering-control allotted amount $X_{STR}$ and braking-force-control allotted amount $X_{BRK}$. That is, steps S3–S8, S10 and S12 serve as an LDP control allotted amount calculation means (lane-deviation decision means plus LDA allotted amount calculation means). Steps S11 and S13 serve as a steering-torque-control controlled variable calculation means. Step S14 serves as a steering torque control means. Steps S16 and S23 of FIG. 3 serve as a desired yaw-moment calculation means. Steps S17 to S22, and S24 serve as a braking-force-control controlled variable calculation means. Step S25 serves as a braking force control means.

Suppose that the host vehicle is traveling along a straight road and there is a less lane-deviation tendency. When the LDP control routine shown in FIG. 2 is executed during straight-ahead driving that the host vehicle is traveling along the straight road, the routine proceeds from step S4 via step S6 to step S8, because lateral-displacement estimate Xs is very small and thus the condition defined by the inequality −Xc<Xs<Xc is satisfied. The processor of ECU 8 determines that there is a less tendency for the host vehicle to deviate from the current driving lane and thus lane-deviation decision flag $F_{LD}$ is reset to "0", i.e., $F_{LD}=0$. As a result, the answer to step S9 becomes affirmative (YES), and thus the routine proceeds from step S9 via step S12 to step S13. Therefore, during the straight-ahead driving, steering-control allotted amount $X_{STR}$, corresponding to the controlled variable for steering torque control executed for lane deviation avoidance, and braking-force-control allotted amount $X_{BRK}$, corresponding to the controlled variable for braking force control executed for lane deviation avoidance, are both set to "0" (see step S12) and desired steering torque τs is also set to "0" (see step S13). The answer to step S15 of FIG. 3 also becomes affirmative (YES), because of $F_{LD}=0$, and thus the routine proceeds from step S15 via step S23 to step S24. As a result, desired yaw moment Ms is set to "0" (see step S23) and additionally front-left and front-right desired wheel-brake cylinder pressures $Ps_{FL}$ and $Ps_{FR}$ are both set to master cylinder pressure Pm, and rear-left and rear-right desired wheel-brake cylinder pressures $Ps_{RL}$ and $Ps_{RR}$ are both set to rear-wheel master-cylinder pressure Pmr (see step S24). Thus, each of wheel-brake cylinder pressures Ps can be regulated depending on the amount of the driver's brake-pedal depression. During the straight-ahead driving, lane deviation prevention (LDP) control, exactly, steering torque control for lane deviation avoidance (LDA) and braking force control for LDA cannot be initiated. Therefore, during the straight-ahead driving, the host vehicle's traveling state, which can be determined based on the driver's steering action and braking action, is continued.

Suppose that a transition from straight-ahead driving to a turn on a gently curved road occurs and additionally the host vehicle tends to gradually deviate from the central axis (the reference axis) of the current driving lane to the left owing to the driver's inattentive driving. In such a case, that is, during the host vehicle's turn on the gently curved road and in presence of the host vehicle's lane-deviation tendency to the left, lateral-displacement estimate Xs becomes greater than or equal to predetermined lateral-displacement criterion Xc. Thus, the LDP control routine proceeds from step S4 via step S5 to step S9, because the condition defined by the inequality Xs≧Xc is satisfied. The processor of ECU 8 determines that there is an increased lane-deviation tendency to the left and thus lane-deviation decision flag $F_{LD}$ is set to "1", i.e., $F_{LD}=1$. As a result, the answer to step S9 becomes negative (NO), and thus the routine proceeds from step S9 via step S10 to step S11. In presence of the transition from straight-ahead driving to a turn on the gently curved road, the driving-lane curvature β of the gentle curve is approximately "0". Thus, as can be appreciated from the predetermined driving-lane curvature β versus control allotted ratio H characteristic map shown in FIG. 4, steering-control allotted ratio $H_{STR}$ is set to "1" and braking-force-control allotted ratio $H_{BRK}$ is set to "0". In other words, steering-control allotted amount $X_{STR}$ is set to "1" and braking-force-control allotted amount $X_{BRK}$ is set to "0". Thereafter, at step S11, desired steering torque τs is arithmetically calculated from the expression (5), that is, τs=$-K_{V1} \times K_{S1} \times X_{STR}$=$-K_{V1} \times K_{S1} \times 1$=$-K_{V1} \times K_{S1}$, because of $X_{STR}=1$. Thereafter, the LDP control routine flows from step S14 via step S15 to step S16, At step S16, desired yaw moment Ms is arithmetically calculated from the expression (8), that is, Ms=$-K_{V2} \times K_{S2} \times X_{BRK}$= $-K_{V2} \times K_{S2} \times 0$=0, because of $X_{BRK}=0$. Owing to Ms=0, the routine of FIG. 3 proceeds from step S16 through step S17 to step S18. By way of step S18, the front desired wheel-brake cylinder pressure difference $\Delta Ps_F$ is set to "0" (see the expression (9)), whereas the rear desired wheel-brake cylinder pressure difference $\Delta Ps_R$ is arithmetically calculated from the expression (10), that is, $\Delta Ps_R$= $2 \times K_{BR} \times |Ms|/T = 2 \times K_{BR} \times 0/T = 0$, because of Ms=0. That is, the front and rear desired wheel-brake cylinder pressure differences $\Delta Ps_F$ and $\Delta Ps_R$ are both set to "0". After this, owing to Ms=0, the routine flows from step S18 via step S20 to step S22. At step S22, front-left, front-right, rear-left, and rear-right desired wheel-brake cylinder pressures $Ps_{FL}$, $Ps_{FR}$, $Ps_{RL}$, $Ps_{RR}$ are calculated from the respective expressions (17)–(20), that is, $Ps_{FL}=Pm+\Delta Ps_F=Pm+0=Pm$, $Ps_{FR}=Pm$, $Ps_{RL}=Pmr+\Delta Ps_R=Pmr+0=Pmr$, and $Ps_{RR}=Pmr$. As a result, front-left and front-right desired wheel-brake cylinder pressures $Ps_{FL}$ and $Ps_{FR}$ are both set to master cylinder pressure Pm, and rear-left and rear-right desired wheel-brake cylinder pressures $Ps_{RL}$ and $Ps_{RR}$ are both set to rear-wheel master-cylinder pressure Pmr via step S22. Thus, each of wheel-brake cylinder pressures Ps can be regulated depending on the amount of the driver's brake-pedal depression. During the host vehicle's turn on the gently curved road, braking force control for LDA cannot be initiated. That is, during the host vehicle's turn on the gently curved road, braking force control for LDA is inhibited or suppressed, and steering torque control for LDA is permitted. Therefore, during the host vehicle's turn on the gently curved road and in presence of the host vehicle's lane-deviation tendency, compensation for the host vehicle's course for lane deviation avoidance is made mainly by way of steering torque control, which is initiated through step S14 and whose controlled variable is determined based on desired steering torque τs (e.g., $-K_{V1} \times K_{S1}$) calculated through step S11, in other words, based on steering-control allotted amount $X_{STR}$.

Next, suppose that the host vehicle is traveling on a steeply curved road and additionally the host vehicle tends to gradually deviate from the central axis of the current driving lane to the left owing to the driver's inattentive driving. In such a case, that is, during the host vehicle's turn on the steeply curved road and in presence of the host vehicle's lane-deviation tendency to the left, lateral displacement estimate Xs becomes greater than or equal to predetermined lateral-displacement criterion Xc. Thus, the LDP control routine proceeds from step S4 via step S5 to step S9, because the condition defined by the inequality Xs≧Xc is satisfied. The processor of ECU 8 determines that there is an increased lane-deviation tendency to the left and thus lane-deviation decision flag $F_{LD}$ is set to "1", i.e., $F_{LD}=1$. Owing to $F_{LD}=1$, the answer to step S9 becomes negative (NO), and thus the routine proceeds from step S9 via step S10 to step S11. During the host vehicle's turn on the steeply curved road, the driving-lane curvature β of the steep curve is great. Thus, as can be seen from the predetermined driving-lane curvature β versus control allotted ratio H characteristic map shown in FIG. 4, steering-control allotted ratio $H_{STR}$ (in other words, steering-control allotted amount $X_{STR}$) is set to a relatively small ratio, such as 0.4, and braking-force-control allotted ratio $H_{BRK}$ (in other words, braking-force-control allotted amount $X_{BRK}$) is set to a relatively large ratio, such as 0.6. As a result of this, at step S11, desired steering torque τs is arithmetically calculated from the expression (5), for example, τs=$-K_{V1} \times K_{S1} \times X_{STR} = -K_{V1} \times K_{S1} \times 0.4$, because of $X_{STR}=0.4$. The absolute value $|-K_{V1} \times K_{S1} \times 0.4|$ of desired steering torque τs suitable to the host vehicle's turning state on the steeply curved road is comparatively smaller than the absolute value $|-K_{V1} \times K_{S1} \times 1|$ of desired steering torque τs suitable to the host vehicle's turning state on the gently curved road or the host vehicle's driving state on the straight road. Thereafter, the LDP control routine flows from step S14 via step S15 to step S16, At step S16, desired yaw moment Ms is arithmetically calculated from the expression (8), for example, Ms=$-K_{V2} \times K_{S2} \times X_{BRK} = -K_{V2} \times K_{S2} \times 0.6$, because of $X_{BRK}=0.6$. Owing to Ms=$-K_{V2} \times K_{S2} \times 0.6$ (a negative value), the routine of FIG. 3 proceeds from step S16 through step S17 to step S19. By way of step S19, the front desired wheel-brake cylinder pressure difference $\Delta Ps_F$ is arithmetically calculated from the expression (11), that is, $\Delta Ps_F = 2 \times K_{BF} \times (|Ms|-Ms0)/T = 2 \times K_{BF} \times (|-K_{V2} \times K_{S2} \times 0.6|-Ms0)/T$, whereas the rear desired wheel-brake cylinder pressure difference $\Delta Ps_R$ is arithmetically calculated from the expression (12), that is, $\Delta Ps_R = 2 \times K_{BR} \times Ms0/T$, because of Ms=$-K_{V2} \times K_{S2} \times 0.6$. After this, owing to Ms=$-K_{V2} \times K_{S2} \times 0.6$, the routine flows from step S19 via step S20 to step S21. At step S21, front-left, front-right, rear-left, and rear-right desired wheel-brake cylinder pressures $Ps_{FL}$, $Ps_{FR}$, $Ps_{RL}$, $Ps_{RR}$ are calculated from the respective expressions (13)–(16), that is, $Ps_{FL}=Pm$, $Ps_{FR}=Pm+\Delta Ps_F=Pm+2 \times K_{BF} \times (|-K_{V2} \times K_{S2} \times 0.6|-Ms0)/T$, $Ps_{RL}=Pmr$, and $Ps_{RR}=Pmr+\Delta Ps_R= Pmr+2 \times K_{BR} \times Ms0/T$. As a result, the right desired wheel-brake cylinder pressures $Ps_{FR}$ and $Ps_{RR}$ are set to be relatively higher than the left desired wheel-brake cylinder pressures $Ps_{FL}$ and $Ps_{RL}$ via step S21. That is, during the host vehicle's turn on the steeply curved road and in presence of the host vehicle's lane-deviation tendency, braking force control for LDA and steering torque control for LDA are both permitted. Therefore, during the host vehicle's turn on the steeply curved road, compensation for the host vehicle's course for lane deviation avoidance is made by way of both of (i) steering torque control, which is initiated through step S14 and whose controlled variable is determined based on desired steering torque τs (e.g., $-K_{V1} \times K_{S1} \times 0.4$) calculated through step S11, in other words, steering-control allotted amount $X_{STR}$, and (ii) braking force control, which is initiated through step S25 and whose controlled variables are determined based on desired wheel-brake cylinder pressures $Ps_{FL}$ (=Pm), $Ps_{FR}$ (=Pm+$2 \times K_{BF} \times (|-K_{V2} \times K_{S2} \times 0.6|-Ms0)/T$), $Ps_{RL}$ (=Pmr), and $Ps_{RR}$ (=Pmr+$2 \times K_{BR} \times Ms0/T$), calculated through step S21, in other words, braking-force-control allotted amount $X_{BRK}$.

As set forth above, according to the LDP apparatus of the embodiment shown in FIGS. 1–3, when the host vehicle tends to deviate from the driving lane on turns, the controlled variable for steering torque control and the controlled variable for braking force control are adjusted and determined based on the host vehicle's turning state. Therefore, the gentler a curve that the host vehicle is going around, that is, the smaller the host vehicle's driving-lane curvature β, the greater the controlled variable of steering torque control for LDA, and therefore the smaller the controlled variable of braking force control for LDA. In other words, the steeper a curve that the host vehicle is going around, that is, the larger the host vehicle's driving-lane curvature β, the smaller the controlled variable of steering torque control for LDA, and therefore the larger the controlled variable of braking force control for LDA. By virtue of such setting of the controlled variable of steering torque control and the controlled variable of braking force control, braking force control can be suitably suppressed during a turn on a gently curved road or in a straight-road driving state, thus effectively reducing a feeling of uncomfortable vehicle deceleration. On the contrary, during a turn on a steeply curved road, the ratio of braking-force-control allotted amount $X_{BRK}$ (braking-force-control allotted rate $H_{BRK}$) to steering-control allotted amount $X_{STR}$ (steering-control allotted rate $H_{STR}$) can be kept high. That is, during a turn on a steeply curved road, a higher priority is put on braking force control rather than steering torque control and thus braking force control is highly permitted but steering torque control is suppressed, thus reducing unnatural feeling that the driver experiences uncomfortable changes in dynamic vehicle behavior, occurring due to an excessive increase in lateral G, and also enhancing the LDP performance or the LDA performance.

In the previously-discussed LDP apparatus of the first embodiment shown in FIGS. 1–3, the driving-lane curvature β is determined based on the image data captured by CCD camera 13 and output from camera controller 14. Instead of using CCD camera 13 and camera controller 14 as the external recognizing detector (13, 14), a car navigation system or an automated highway equipped with an infrastructure may be used as external recognizing detector (13, 14). In such a case, a driving-lane curvature data can be given by extracting input information regarding a current driving-lane curvature, as map data, while utilizing the car navigation system. In case of an automated highway equipped with an infrastructure, a road data, which is obtained and received by way of mutual communication between the host vehicle and the on-road network (or the on-road sensor or the on-road marker) contained in the infrastructure, may be used as input information regarding a driving-lane curvature.

Figure 5:
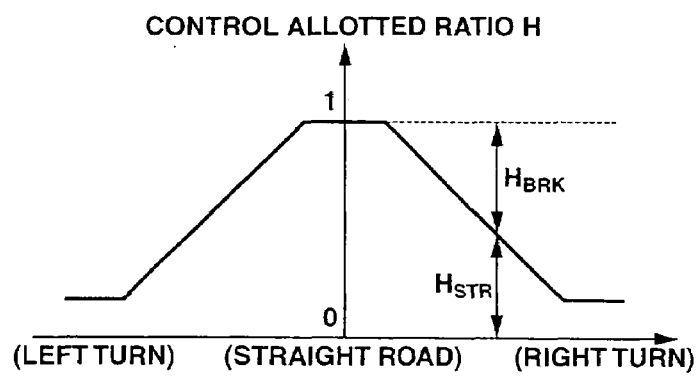
FIG. 5 is a preprogrammed host vehicle's turning curvature $\beta v$ versus control allotted ratio H characteristic map.

Also, in the LDP apparatus of the embodiment, steering-control allotted ratio $H_{STR}$ (steering-control allotted amount $X_{STR}$) and braking-force-control allotted ratio $H_{BRK}$ (braking-force-control allotted amount $X_{BRK}$) are retrieved and determined based on the current driving-lane curvature β from the predetermined driving-lane curvature β versus control allotted ratio H characteristic map of FIG. 4. In lieu thereof, steering-control allotted ratio $H_{STR}$ (steering-control allotted amount $X_{STR}$) and braking-force-control allotted ratio $H_{BRK}$ (braking-force-control allotted amount $X_{BRK}$) may be retrieved and determined based on a host vehicle's turning curvature β v, which is based on host vehicle speed V and steer angle δ. For instance, host vehicle's turning curvature βv may be arithmetically calculated based on host vehicle speed V and steer angle δ from the following expression (24).

$$\beta v = K_{V3} \times \delta / V \qquad (24)$$

where $K_{V3}$ denotes a constant that is determined by specifications of the host vehicle. That is, steering-control allotted ratio $H_{STR}$ (steering-control allotted amount $X_{STR}$) and braking-force-control allotted ratio $H_{BRK}$ (braking-force-control allotted amount $X_{BRK}$) may be retrieved and determined based on the current host vehicle's turning curvature βv from a predetermined host vehicle's turning curvature βv versus control allotted ratio H characteristic map shown in FIG. 5. Although steer angle δ is used to estimate or evaluate the host vehicle's turning state, in lieu thereof yaw rate φ or lateral acceleration Yg may be used.

Figure 6:
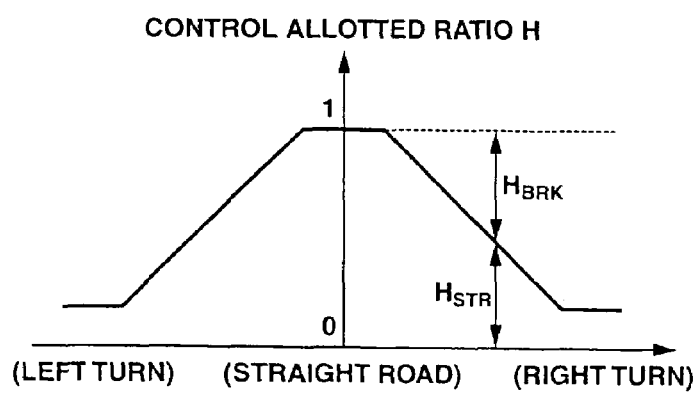
FIG. 6 is a preprogrammed lateral acceleration Yg versus control allotted ratio H characteristic map.

Alternatively, steering-control allotted ratio $H_{STR}$ (steering-control allotted amount $X_{STR}$) and braking-force-control allotted ratio $H_{BRK}$ (braking-force-control allotted amount $X_{BRK}$) may be retrieved and determined directly based on the current host vehicle's lateral acceleration Yg from a predetermined host vehicle's lateral acceleration Yg versus control allotted ratio H characteristic map shown in FIG. 6. In this case, lateral acceleration Yg is used to estimate or determine the host vehicle's turning state. In the characteristic map shown in FIG. 6, as the host vehicle's turning state indicative data used to determine control allotted ratio H (exactly, both of steering-control allotted ratio $H_{STR}$ and braking-force-control allotted ratio $H_{BRK}$) lateral acceleration Yg is utilized. Instead of using lateral acceleration Yg, either one of steer angle δ and yaw rate φ may be used.

Figure 7:
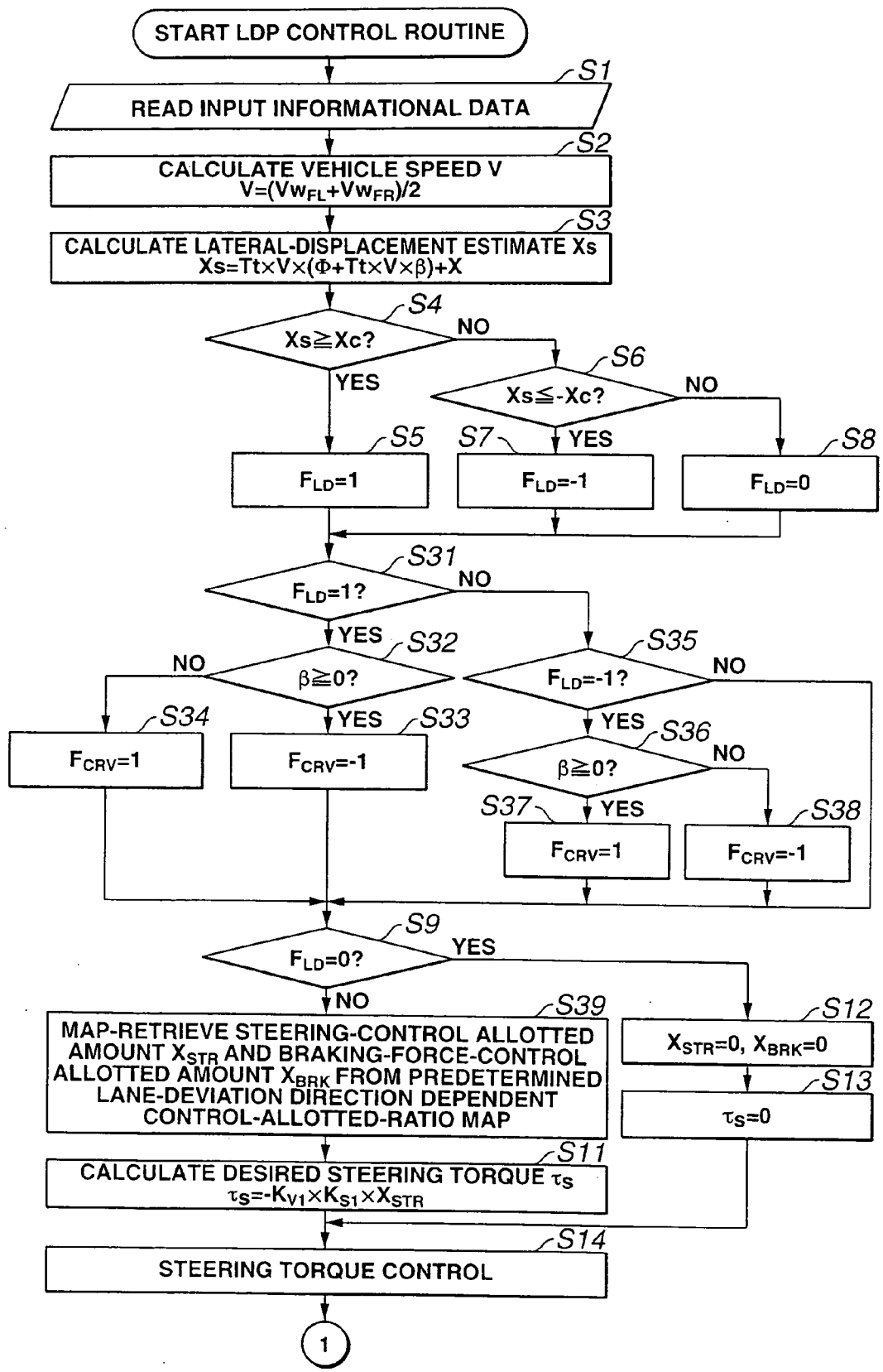
FIG. 7 is a flow chart showing a former half of the LDP control routine executed within an ECU incorporated in a first modified LDP apparatus.
Figure 8A:
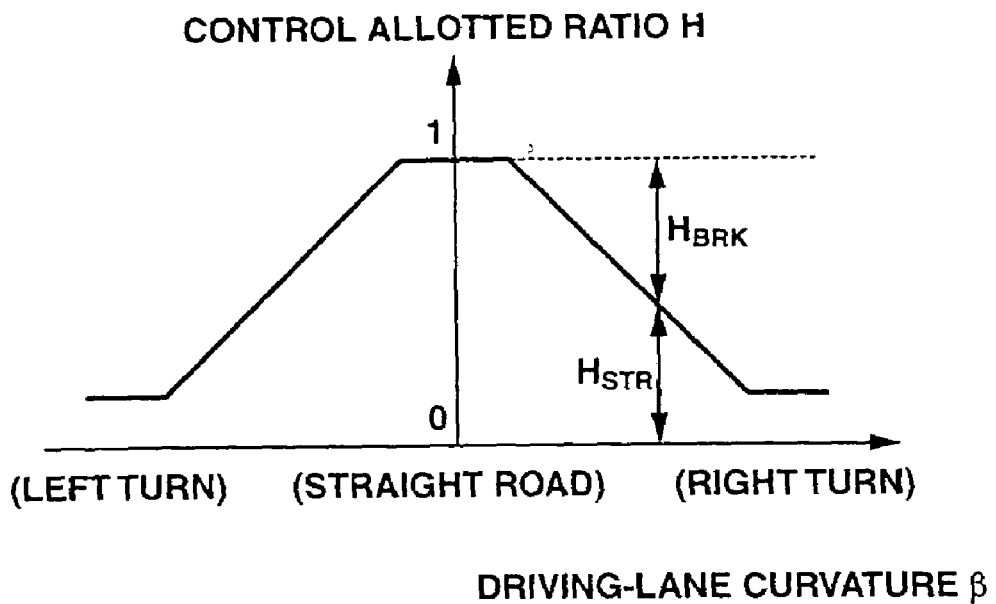
FIG. 8A is a preprogrammed driving-lane curvature $\beta$ versus control allotted ratio H characteristic map used under a condition where the host vehicle tends to deviate toward the outside of a turn.
Figure 8B:
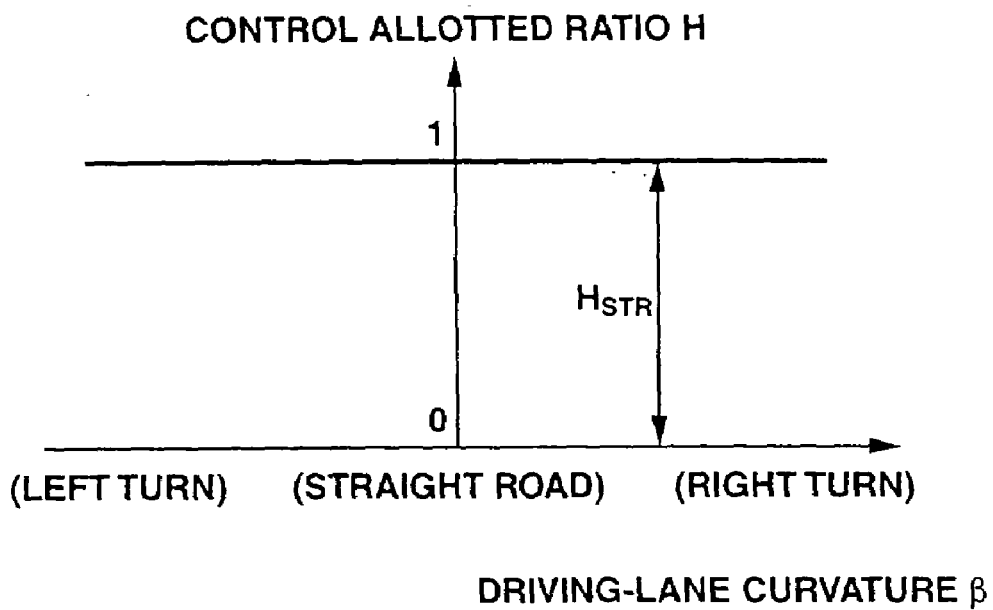
FIG. 8B is a preprogrammed driving-lane curvature $\beta$ versus control allotted ratio H characteristic map used under a condition where the host vehicle tends to deviate toward the inside of a turn.

Referring now to FIG. 7, there is shown the former half of the LDP control routine executed within the ECU incorporated in the first modified LDP apparatus. In order to determine steering-control allotted ratio $H_{STR}$ (steering-control allotted amount $X_{STR}$) and braking-force-control allotted ratio $H_{BRK}$ (braking-force-control allotted amount $X_{BRK}$), in the first modified LDP apparatus shown in FIG. 7, the host vehicle's turn direction (in other words, the host vehicle's lane-deviation direction) and the host vehicle's turning state (exactly, driving-lane curvature β, host vehicle's turning curvature β, lateral acceleration Yg, yaw rate φ, or steer angle δ), are taken into account. As hereinafter described in detail, steering-control allotted ratio $H_{STR}$ (steering-control allotted amount $X_{STR}$) and braking-force-control allotted ratio $H_{BRK}$ (braking-force-control allotted amount $X_{BRK}$) are determined depending on driving-lane curvature β and depending on whether the host vehicle tends to deviate toward the outside of a turn (see the characteristic map of FIG. 8A described later) or toward the inside of a turn (see the characteristic map of FIG. 8B described later). As appreciated from comparison between the routines shown in FIGS. 2 and 7, the first modified LDP apparatus shown in FIG. 7 is similar to the LDP apparatus of the embodiment shown in FIGS. 1–3, except that steps S31–S38 are added before step S9, and additionally step S10 of FIG. 2 is replaced with step S39 utilizing the predetermined characteristic maps shown in FIGS. 8A–8B respectively suitable to a host vehicle's lane-deviation tendency toward the outside of a turn and a host vehicle's lane-deviation tendency toward the inside of a turn. In FIGS. 8A–8B, the right turn means a rightward curved road, whereas the left turn means a leftward curved road. Thus, the same step numbers used to designate steps in the routine shown in FIG. 2 will be applied to the corresponding step numbers used in the first modified routine shown in FIG. 7, for the purpose of comparison of the two different interrupt routines. Steps S31–S39 will be hereinafter described in detail with reference to the accompanying drawings, while detailed description of steps S1–S9, and S11–S14 will be omitted because the above description thereon seems to be self-explanatory.

At step S31, a check is made to determine whether lane-deviation decision flag $F_{LD}$ is set to "1", exactly "+1". When the answer to step S31 is affirmative (YES), that is, $F_{LD}=1$, the routine proceeds from step S31 to step S32.

At step S32, another check is made to determine whether driving-lane curvature β is greater than or equal to "0". The inequality β≧0 means a rightward curved road, whereas the inequality β<0 means a leftward curved road. In case of β≧0 (i.e., during driving on the rightward curved road) and in presence of the host vehicle's lane-deviation tendency to the left, the processor of ECU 8 determines that the host vehicle tends to deviate toward the outside of a turn, and then the routine proceeds from step S32 to S33.

At step S33, a turn direction decision flag $F_{CRV}$ is set to "−1". $F_{CRV}=-1$ means the host vehicle's lane-deviation tendency toward the outside of a turn.

Conversely in case of β<0 (i.e., during driving on the leftward curved road) and in presence of the host vehicle's lane-deviation tendency to the left, the processor of ECU 8 determines that the host vehicle tends to deviate toward the inside of a turn, and then the routine proceeds from step S32 to S34.

At step S34, turn direction decision flag $F_{CRV}$ is set to "1", exactly "+1". $F_{CRV}=1$ means the host vehicle's lane-deviation tendency toward the inside of a turn.

On the contrary, when the answer to step S31 is negative (NO), that is, $F_{LD}\neq 1$, the routine proceeds from step S31 to step S35.

At step S35, another check is made to determine whether lane-deviation decision flag $F_{LD}$ is set to "−1". When the answer to step S35 is affirmative (YES), that is, $F_{LD}=-1$, the routine proceeds from step S35 to step S36. Conversely when the answer to step S35 is negative (NO), that is, $F_{LD}=0$, the routine flows from step S35 to step S9.

In the same manner as step S32, at step S36, another check is made to determine whether driving-lane curvature β is greater than or equal to "0". In case of β≧0 (i.e., during driving on the rightward curved road) and in presence of the host vehicle's lane-deviation tendency to the right, the processor of ECU 8 determines that the host vehicle tends to deviate toward the inside of a turn, and then the routine proceeds from step S36 to S37.

At step S37, turn direction decision flag $F_{CRV}$ is set to "1".

Conversely in case of β<0 (i.e., during driving on the leftward curved road) and in presence of the host vehicle's lane-deviation tendency to the right, the processor of ECU 8 determines that the host vehicle tends to deviate toward the outside of a turn, and then the routine proceeds from step S36 to S38.

At step S38, turn direction decision flag $F_{CRV}$ is set to "−1".

After steps S33, S34, S37, or S38, step S9 occurs.

When the answer to step S9 is negative (NO), that is, in case of $F_{LD}\neq 0$, the routine proceeds from step S9 to step S39 of FIG. 7.

At step S39, steering-control allotted ratio $H_{STR}$ (steering-control allotted amount $X_{STR}$) and braking-force-control allotted ratio $H_{BRK}$ (braking-force-control allotted amount $X_{BRK}$) are retrieved or determined based on driving-lane curvature β and also based on whether the host vehicle tends to deviate toward the outside of a turn or toward the inside of a turn, from the selected one of the two different control allotted ratio H characteristic maps of FIGS. 8A and 8B, respectively suitable to a host vehicle's lane-deviation tendency toward the outside of a turn and a host vehicle's lane-deviation tendency toward the inside of a turn. Actually, under a state of $F_{CRV}=-1$ indicative of the host vehicle's lane-deviation tendency toward the outside of a turn, steering-control allotted ratio $H_{STR}$ (steering-control allotted amount $X_{STR}$) and braking-force-control allotted ratio $H_{BRK}$ (braking-force-control allotted amount $X_{BRK}$) are determined based on driving-lane curvature β from the control allotted ratio H characteristic map of FIG. 8A suitable to a host vehicle's lane-deviation tendency toward the outside of a turn. Conversely under a state of $F_{CRV}=1$ indicative of the host vehicle's lane-deviation tendency toward the inside of a turn, steering-control allotted ratio $H_{STR}$ (steering-control allotted amount $X_{STR}$) and braking-force-control allotted ratio $H_{BRK}$ (braking-force-control allotted amount $X_{BRK}$) are determined based on driving-lane curvature β from the control allotted ratio H characteristic map of FIG. 8B suitable to a host vehicle's lane-deviation tendency toward the inside of a turn.

As can be seen from the predetermined driving-lane curvature β versus control allotted ratio H characteristic map of FIG. 8A suitable to a host vehicle's lane-deviation tendency toward the outside of a turn, the gentler a curve that the vehicle is going around, in other words, the smaller the driving-lane curvature β, the greater the steering-control allotted ratio $H_{STR}$ that can be map-retrieved from the control allotted ratio H characteristic map of FIG. 8A. The steeper a curve that the vehicle is going around, in other words, the greater the driving-lane curvature β, the greater the braking-force-control allotted ratio $H_{BRK}$ that can be map-retrieved from the control allotted ratio H characteristic map of FIG. 8A. On the other hand, the predetermined driving-lane curvature β versus control allotted ratio H characteristic map of FIG. 8B suitable to a host vehicle's lane-deviation tendency toward the inside of a turn, is set such that steering-control allotted ratio $H_{STR}$ (steering-control allotted amount $X_{STR}$) is set to "1" and braking-force-control allotted ratio $H_{BRK}$ (braking-force-control allotted amount $X_{BRK}$) is set to "0", irrespective of whether driving-lane curvature β is steep or gentle.

Steps S31–S38 of FIG. 7 serve as a lane-deviation direction detection means.

Suppose that the host vehicle is traveling on a leftward curved road (i.e., β<0) and additionally the host vehicle tends to gradually deviate from the central axis of the current driving lane to the right owing to the driver's inattentive driving. In such a case, that is, during the host vehicle's turn on the leftward curved road (i.e., β<0) and in presence of the host vehicle's lane-deviation tendency to the right, lateral displacement estimate Xs becomes less than or equal to the negative value −Xc of predetermined lateral-displacement criterion Xc. Thus, the LDP control routine of FIG. 7 proceeds from step S4 via step S6 to step S7, because the condition defined by the inequality Xs≦−Xc is satisfied. The processor of ECU 8 determines that there is an increased lane-deviation tendency to the right and thus lane-deviation decision flag $F_{LD}$ is set to "−1", i.e., $F_{LD}$=−1. Owing to $F_{LD}$=−1, the answer to step S31 becomes negative (NO), and thus the routine proceeds from step S31 via step S35 to step S36. During the host vehicle's turn on the leftward curved road (i.e., β<0), the driving-lane curvature β of the leftward curved road is negative. Owing to β<0 and $F_{LD}$=−1, the routine flows from step S36 via steps S38 and step S9 to step S39. Concretely, turn direction decision flag $F_{CRV}$ is set to "−1" through step S38. Thereafter, at step S39, steering-control allotted ratio $H_{STR}$ (steering-control allotted amount $X_{STR}$) and braking-force-control allotted ratio $H_{BRK}$ (braking-force-control allotted amount $X_{BRK}$) are retrieved based on driving-lane curvature β from the control allotted ratio H characteristic map of FIG. 8A suitable to a host vehicle's lane-deviation tendency toward the outside of a turn. That is, during the host vehicle's turn on the leftward curved road (i.e., β<0) and in presence of the host vehicle's lane-deviation tendency toward the outside of a turn, braking force control executed based on the calculated braking-force-control allotted ratio $H_{BRK}$ and steering torque control executed based on the calculated steering-control allotted ratio $H_{STR}$ are both permitted. Therefore, during the host vehicle's turn on the leftward curved road (i.e., β<0) and in presence of the host vehicle's lane-deviation tendency toward the outside of a turn, compensation for the host vehicle's course to the leftward direction for lane deviation avoidance is made by way of both of (i) steering torque control, which is initiated through step S14 and whose controlled variable is determined based on steering-control allotted amount $X_{STR}$ map-retrieved from the predetermined map of FIG. 8A suitable to a host vehicle's lane-deviation tendency toward the outside of a turn, and (ii) braking force control, which is initiated through step S25 and whose controlled variable is determined based on braking-force-control allotted amount $X_{BRK}$ map-retrieved from the predetermined map of FIG. 8A.

On the contrary, suppose that the host vehicle is traveling on a leftward curved road (i.e., β<0) and additionally the host vehicle tends to gradually deviate from the central axis of the current driving lane to the left owing to the driver's inattentive driving. In such a case, that is, during the host vehicle's turn on the leftward curved road (i.e., β<0) and in presence of the host vehicle's lane-deviation tendency to the left, lateral displacement estimate Xs becomes greater than or equal to predetermined lateral-displacement criterion Xc. Thus, the LDP control routine of FIG. 7 proceeds from step S4 via step S5 to step S31, because the condition defined by the inequality Xs≧Xc is satisfied. The processor of ECU 8 determines that there is an increased lane-deviation tendency to the left and thus lane-deviation decision flag $F_{LD}$ is set to "1", i.e., $F_{LD}$=1. Owing to $F_{LD}$=1, the answer to step S31 becomes affirmative (YES), and thus the routine proceeds from step S31 to step S32. During the host vehicle's turn on the leftward curved road (i.e., β<0), the driving-lane curvature β of the leftward curved road is negative. Owing to β<0 and $F_{LD}$=1, the routine flows from step S32 via steps S34 and step S9 to step S39. Concretely, turn direction decision flag $F_{CRV}$ is set to "1" through step S34. Thereafter, at step S39, steering-control allotted ratio $H_{STR}$ (steering-control allotted amount $X_{STR}$) is set to "1" and braking-force-control allotted ratio $H_{BRK}$ (braking-force-control allotted amount $X_{BRK}$) is set to "0" according to the control allotted ratio H characteristic map of FIG. 8B suitable to a host vehicle's lane-deviation tendency toward the inside of a turn. That is, during the host vehicle's turn on the leftward curved road (i.e., β<0) and in presence of the host vehicle's lane-deviation tendency toward the inside of a turn, braking force control is inhibited with braking-force-control allotted ratio $H_{BRK}$ set to "0", while steering torque control is permitted with steering-control allotted ratio $H_{STR}$ set to "1". Therefore, during the host vehicle's turn on the leftward curved road (i.e., β<0) and in presence of the host vehicle's lane-deviation tendency toward the inside of a turn, compensation for the host vehicle's course to the rightward direction for lane deviation avoidance is made by way of only the steering torque control, which is initiated through step S14 and whose controlled variable is determined based on steering-control allotted amount $X_{STR}$ set to "1" through the predetermined map of FIG. 8B suitable to a host vehicle's lane-deviation tendency toward the inside of a turn.

As discussed above, according to the first modified LDP apparatus shown in FIGS. 7–8B, when the host vehicle tends to deviate from the driving lane on turns, the controlled variable for steering torque control and the controlled variable for braking force control can be adjusted and determined based on the host vehicle's lane-deviation direction, that is, depending on whether the host vehicle tends to deviate toward the outside of a turn or toward the inside of a turn. In presence of the host vehicle's lane-deviation tendency toward the outside of a turn, the controlled variable (substantially corresponding to steering-control allotted ratio $H_{STR}$) of steering torque control and the controlled variable (substantially corresponding to braking-force-control allotted ratio $H_{BRK}$) are set or determined based on driving-lane curvature β from the predetermined outside-lane-deviation period control allotted ratio H characteristic map of FIG. 8A. Conversely in presence of the host vehicle's lane-deviation tendency toward the inside of a turn, the controlled variable (substantially corresponding to steering-control allotted ratio $H_{STR}$) of steering torque control is set to "1" and the controlled variable (substantially corresponding to braking-force-control allotted ratio $H_{BRK}$) is set to "0" irrespective of driving-lane curvature P according to the predetermined inside-lane-deviation period control allotted ratio H characteristic map of FIG. 8B, so as to permit only the steering torque control. Therefore, in presence of the host vehicle's lane-deviation tendency toward the outside of a turn, it is possible to effectively suppress an undesirable increase in lateral acceleration Yg by reducing the host vehicle's speed V, and also to enhance the LDP performance.

In the previously-discussed first modified LDP apparatus shown in FIG. 7, when the processor of ECU 8 determines that there is a host vehicle's lane-deviation tendency toward the inside of a turn, steering-control allotted ratio $H_{STR}$ (steering-control allotted amount $X_{STR}$) and braking-force-control allotted ratio $H_{BRK}$ (braking-force-control allotted amount $X_{BRK}$) are determined or map-retrieved from the predetermined inside-lane-deviation period control allotted ratio H characteristic map of FIG. 8B. In presence of a host vehicle's lane-deviation tendency toward the inside of a turn, steering-control allotted ratio $H_{STR}$ (steering-control allotted amount $X_{STR}$) may be fixed to "1", while braking-force-control allotted ratio $H_{BRK}$ (braking-force-control allotted amount $X_{BRK}$) may be fixed to "0", without retrieving the predetermined inside-lane-deviation period control allotted ratio H characteristic map of FIG. 8B.

Figure 9A:
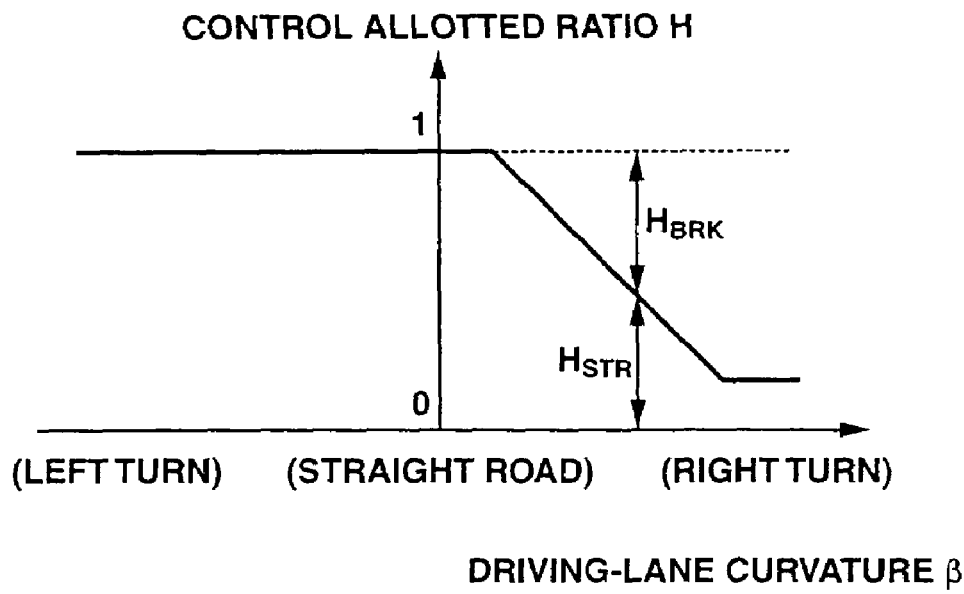
FIG. 9A is a preprogrammed driving-lane curvature $\beta$ versus control allotted ratio H characteristic map used under a condition where the host vehicle has a left lane-deviation tendency.

Also, in the first modified LDP apparatus shown in FIG. 7, through step S39 of FIG. 7, switching between the predetermined outside-lane-deviation period control allotted ratio H characteristic map of FIG. 8A (suitable to a host vehicle's lane-deviation tendency toward the outside of a turn) and the predetermined inside-lane-deviation period control allotted ratio H characteristic map of FIG. 8B (suitable to a host vehicle's lane-deviation tendency toward the inside of a turn) is made depending on whether turn direction decision flag $F_{CRV}$ is set to "−1" or "+1". In order to map-retrieve and determine steering-control allotted ratio $H_{STR}$ (steering-control allotted amount $X_{STR}$) and braking-force-control allotted ratio $H_{BRK}$ (braking-force-control allotted amount $X_{BRK}$), lane-deviation decision flag $F_{LD}$ itself may be used instead of using turn direction decision flag $F_{CRV}$. In this case, under the condition defined by $F_{LD}=1$ (indicative of the host vehicle's lane-deviation tendency to the left), steering-control allotted ratio $H_{STR}$ (steering-control allotted amount $X_{STR}$) and braking-force-control allotted ratio $H_{BRK}$ (braking-force-control allotted amount $X_{BRK}$) can be retrieved from a predetermined leftward-lane-deviation period control allotted ratio H characteristic map shown in FIG. 9A. Conversely under the condition defined by $F_{LD}=-1$ (indicative of the host vehicle's lane-deviation tendency to the right), steering-control allotted ratio $H_{STR}$ (steering-control allotted amount $X_{STR}$) and braking-force-control allotted ratio $H_{BRK}$ (braking-force-control allotted amount $X_{BRK}$) can be retrieved from a predetermined rightward-lane-deviation period control allotted ratio H characteristic map shown in FIG. 9B. As can be seen from comparison of the maps shown in FIGS. 8A–8B and 9A, the first quadrant (the right-hand half) of the map of FIG. 9A is identical to the first quadrant (the right-hand half) of the map of FIG. 8A, whereas the second quadrant (the left-hand half) of the map of FIG. 9A is identical to the second quadrant (the left-hand half) of the map of FIG. 8B. On the other hand, the first quadrant (the right-hand half) of the map of FIG. 9B is identical to the first quadrant (the right-hand half) of the map of FIG. 8B, whereas the second quadrant (the left-hand half) of the map of FIG. 9B is identical to the second quadrant (the left-hand half) of the map of FIG. 8A.

As can be seen from the predetermined leftward-lane-deviation period control allotted ratio H characteristic map shown in FIG. 9A suitable to a host vehicle's lane-deviation tendency to the left, when driving-lane curvature β is less than "0", that is, in case of β<0, steering-control allotted ratio $H_{STR}$ (steering-control allotted amount $X_{STR}$) is set to "1" and braking-force-control allotted ratio $H_{BRK}$ (braking-force-control allotted amount $X_{BRK}$) is set to "0", irrespective of the magnitude of driving-lane curvature β. Conversely when driving-lane curvature β is greater than or equal to "0", that is, in case of β≧0, the gentler a curve that the vehicle is going around, in other words, the smaller the driving-lane curvature β, the greater the steering-control allotted ratio $H_{STR}$ that can be map-retrieved from the control allotted ratio H characteristic map of FIG. 9A. The steeper a curve that the vehicle is going around, in other words, the greater the driving-lane curvature β, the greater the braking-force-control allotted ratio $H_{BRK}$ that can be map-retrieved from the control allotted ratio H characteristic map of FIG. 9A.

Figure 9B:
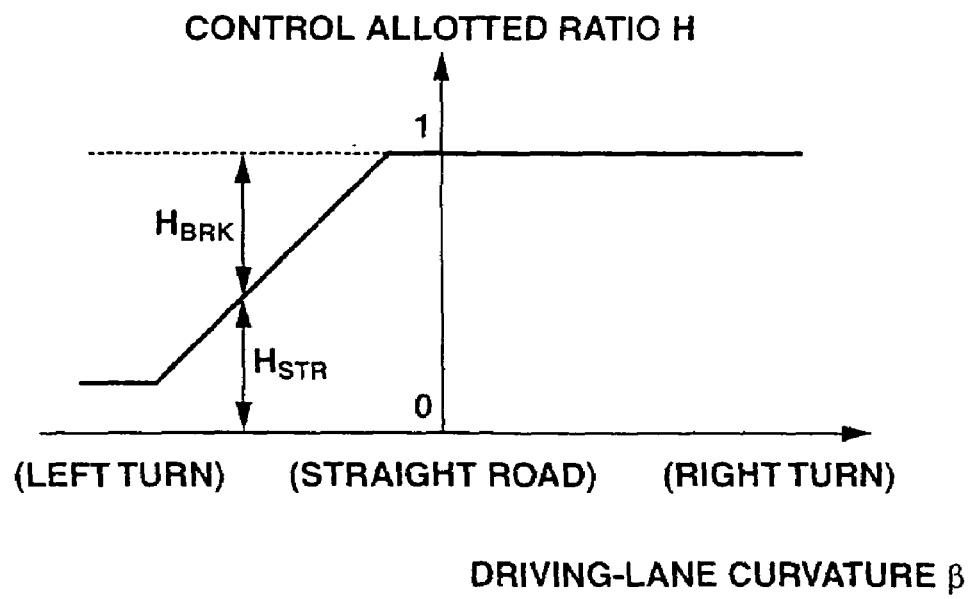
FIG. 9B is a preprogrammed driving-lane curvature $\beta$ versus control allotted ratio H characteristic map used under a condition where the host vehicle has a right lane-deviation tendency.

As can be seen from the predetermined rightward-lane-deviation period control allotted ratio H characteristic map shown in FIG. 9B suitable to a host vehicle's lane-deviation tendency to the right, when driving-lane curvature P is less than "0", that is, in case of β<0, the gentler a curve that the vehicle is going around, in other words, the smaller the driving-lane curvature β, the greater the steering-control allotted ratio $H_{STR}$ that can be map-retrieved from the control allotted ratio H characteristic map of FIG. 9B. The steeper a curve that the vehicle is going around, in other words, the greater the driving-lane curvature β, the greater the braking-force-control allotted ratio $H_{BRK}$ that can be map-retrieved from the control allotted ratio H characteristic map of FIG. 9B. Conversely when driving-lane curvature β is greater than or equal to "0", that is, in case of β≧0, steering-control allotted ratio $H_{STR}$ (steering-control allotted amount $X_{STR}$) is set to "1" and braking-force-control allotted ratio $H_{BRK}$ (braking-force-control allotted amount $X_{BRK}$) is set to "0", irrespective of the magnitude of driving-lane curvature β.

Therefore, in a similar manner to map-retrieval based on FIGS. 8A–8B, by way of map-retrieval based on FIGS. 9A–9B, when there is a host vehicle's lane-deviation tendency toward the outside of a turn, the controlled variable of steering control and the controlled variable of braking force control can be properly set or determined based on driving-lane curvature β. On the contrary, when there is a host vehicle's lane-deviation tendency toward the inside of a turn, the controlled variable of braking force control can be set or fixed to "0", while the controlled variable of steering control can be set or fixed to "1", thus enabling compensation for the host vehicle's course for lane deviation avoidance by way of only the steering torque control.

Figure 10:
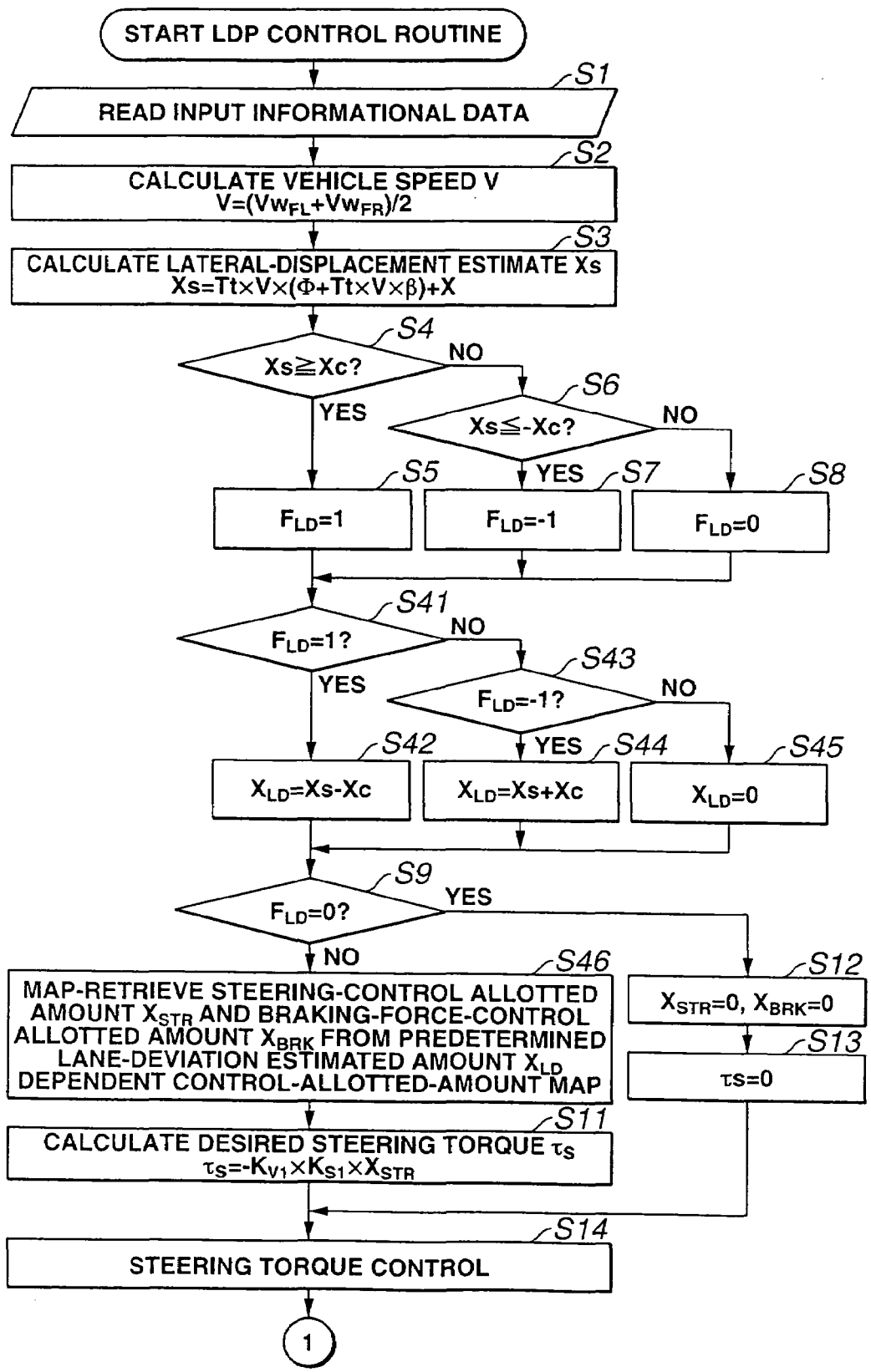
FIG. 10 is a flow chart showing a former half of the LDP control routine executed within an ECU incorporated in a second modified LDP apparatus.

Referring now to FIG. 10, there is shown the former half of the LDP control routine executed within the ECU incorporated in the second modified LDP apparatus. As hereunder described in detail in reference to FIGS. 10–11, in the second modified LDP apparatus shown in FIG. 10, steering-control allotted ratio $H_{STR}$ (steering-control allotted amount $X_{STR}$) and braking-force-control allotted ratio $H_{BRK}$ (braking-force-control allotted amount $X_{BRK}$) are determined depending on lateral-displacement estimate Xs (=Tt×V× ($\Phi$+Tt×V×$\beta$)+X). As appreciated from comparison between the routines shown in FIGS. 2 and 10, the second modified LDP apparatus shown in FIG. 10 is similar to the LDP apparatus of the embodiment shown in FIGS. 1–3, except that steps S41–S45 are added before step S9, and additionally step S10 of FIG. 2 is replaced with step S46 utilizing the predetermined lane-deviation estimated amount $X_{LD}$ dependent control-allotted-amount characteristic map shown in FIG. 11. By way of a series of steps S41–S45 of FIG. 10, a lane-deviation estimated amount $X_{LD}$, which is defined as a summed value ($X_{STR}+X_{BRK}$) of steering-control allotted amount $X_{STR}$ and braking-force-control allotted amount $X_{BRK}$, is arithmetically calculated. That is, under a prerequisite defined by the equality $X_{LD}=X_{STR}+X_{BRK}$, in the second modified LDP apparatus shown in FIG. 10, steering-control allotted ratio $H_{STR}$ (steering-control allotted amount $X_{STR}$) and braking-force-control allotted ratio $H_{BRK}$ (braking-force-control allotted amount $X_{BRK}$) are determined depending on lateral-displacement estimate Xs (=Tt×V× ($\Phi$+Tt×V×$\beta$)+X). Thus, the same step numbers used to designate steps in the routine shown in FIG. 2 will be applied to the corresponding step numbers used in the second modified routine shown in FIG. 10, for the purpose of comparison of the two different interrupt routines. Steps S41–S46 will be hereinafter described in detail with reference to the accompanying drawings, while detailed description of steps S1–S9, and S11–S14 will be omitted because the above description thereon seems to be self-explanatory.

At step S41, a check is made to determine whether lane-deviation decision flag $F_{LD}$ is set to "1". When the answer to step S41 is affirmative (YES), that is, $F_{LD}$=1, the routine proceeds from step S41 to step S42.

At step S42, lane-deviation estimated amount $X_{LD}$ (=$X_{STR}+X_{BRK}$) is arithmetically calculated based on lateral-displacement estimate Xs (=Tt×V×($\Phi$+Tt×V×$\beta$)+X) from the following expression (25).

$$X_{LD}=Xs-Xc \qquad (25)$$

Conversely when the answer to step S41 is negative (NO), that is, $F_{LD}\neq 1$, the routine proceeds from step S41 to step S43.

At step S43, another check is made to determine whether lane-deviation decision flag $F_{LD}$ is set to "−1". When the answer to step S43 is affirmative (YES), that is, $F_{LD}$=−1, the routine proceeds from step S43 to step S44.

At step S44, lane-deviation estimated amount $X_{LD}$ (=$X_{STR}+X_{BRK}$) is arithmetically calculated based on lateral-displacement estimate Xs (=Tt×V×($\Phi$+Tt×V×$\beta$)+X) from the following expression (26).

$$X_{LD}=Xs+Xc \qquad (26)$$

On the contrary, when the answer to step S43 is negative (NO), that is, $F_{LD}\neq -1$, the routine proceeds from step S43 to step S45.

At step S45, lane-deviation estimated amount $X_{LD}$ (=$X_{STR}+X_{BRK}$) is set to "0" according to the following expression (27).

$$X_{LD}=0 \qquad (27)$$

After steps S42, S44, or S45, step S9 occurs.

When the answer to step S9 is negative (NO), that is, in case of $F_{LD}\neq 0$, the routine proceeds from step S9 to step S46 of FIG. 10.

Figure 11:
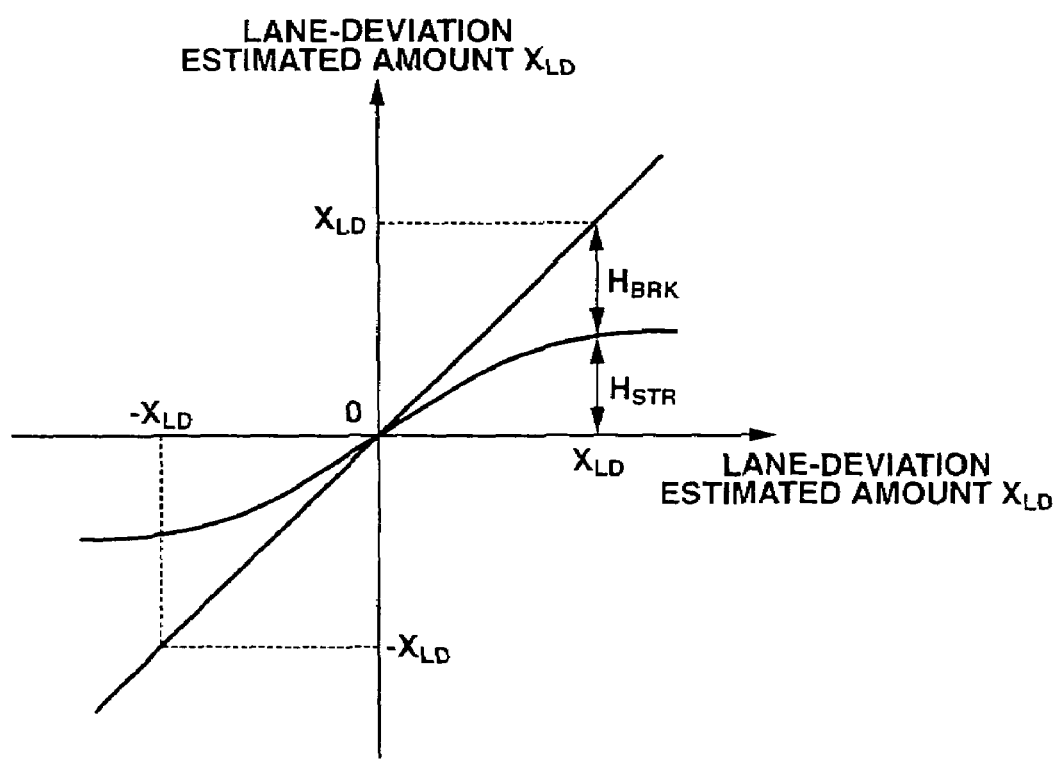
FIG. 11 is a preprogrammed lane-deviation estimated amount $X_{LD}$ versus steering-control allotted amount $X_{STR}$ (steering-control allotted rate $H_{STR}$) versus braking-force-control allotted amount $X_{BRK}$ (braking-force-control allotted rate $H_{BRK}$) characteristic map stored in a memory of the ECU of the second modified LDP apparatus of FIG. 10.

At step S46, steering-control allotted ratio $H_{STR}$ (steering-control allotted amount $X_{STR}$) and braking-force-control allotted ratio $H_{BRK}$ (braking-force-control allotted amount $X_{BRK}$) are retrieved or determined based on lane-deviation estimated amount $X_{LD}$ from the predetermined lane-deviation estimated amount $X_{LD}$ dependent control-allotted-amount characteristic map shown in FIG. 11.

As can be seen from the predetermined lane-deviation estimated amount $X_{LD}$ dependent control-allotted-amount characteristic map shown in FIG. 11, the smaller the absolute value $|X_{LD}|$ of lane-deviation estimated amount $X_{LD}$, the greater the steering-control allotted ratio $H_{STR}$ (steering-control allotted amount $X_{STR}$) that can be map-retrieved or calculated from the predetermined lane-deviation estimated amount $X_{LD}$ dependent control-allotted-amount characteristic map shown in FIG. 11. In other words, the greater the absolute value $|X_{LD}|$ of lane-deviation estimated amount $X_{LD}$, the greater the braking-force-control allotted ratio $H_{BRK}$ (braking-force-control allotted amount $X_{BRK}$) that can be map-retrieved or calculated from the predetermined lane-deviation estimated amount $X_{LD}$ dependent control-allotted-amount characteristic map shown in FIG. 11.

Steps S41–S45 of FIG. 10 serve as a lane-deviation amount calculation means.

Suppose that the host vehicle tends to slightly deviate from the central axis of the current driving lane to the left. In such a case, that is, in presence of the slight lane-deviation tendency of the host vehicle to the left, lane-deviation decision flag $F_{LD}$ is set to "1", because of the leftward lane deviation, and thus the LDP control routine of FIG. 10 flows from step S41 via steps S42 and S9 to step S46. At step S42, lane-deviation estimated amount $X_{LD}$ is calculated as a comparatively small value, because of the comparatively small lateral-displacement estimate Xs (=Tt×V× ($\Phi$+Tt×V×$\beta$)+X). Owing to the comparatively small lane-deviation estimated amount $X_{LD}$ calculated, steering-control allotted ratio $H_{STR}$ (steering-control allotted amount $X_{STR}$ substantially corresponding to the controlled variable of steering torque control) is set to a relatively higher value in comparison with braking-force-control allotted ratio $H_{BRK}$ (braking-force-control allotted amount $X_{BRK}$ substantially corresponding to the controlled variable of braking force control) through step S46. In other words, a ratio ($H_{BRK}/H_{STR}=X_{BRK}/X_{STR}$) of braking-force-control allotted ratio $H_{BRK}$ (braking-force-control allotted amount $X_{BRK}$) to steering-control allotted ratio $H_{STR}$ (steering-control allotted amount $X_{STR}$) is set to a relatively lower value. Thus, in presence of the slight host vehicle's lane-deviation tendency to the left, it is possible to suitably achieve compensation for the host vehicle's course to the rightward direction for lane deviation avoidance mainly by steering torque control, while suppressing braking force control.

Next, suppose that the host vehicle tends to remarkably deviate from the central axis of the current driving lane to the left. In such a case, that is, in presence of the remarkable lane-deviation tendency of the host vehicle to the left, lane-deviation decision flag $F_{LD}$ is set to "1", because of the leftward lane deviation, and thus the LDP control routine of FIG. 10 flows from step S41 via steps S42 and S9 to step S46. At step S42, lane-deviation estimated amount $X_{LD}$ is calculated as a comparatively large value, because of the comparatively large lateral-displacement estimate Xs. Owing to the comparatively large lane-deviation estimated amount $X_{LD}$ calculated, braking-force-control allotted ratio $H_{BRK}$ (braking-force-control allotted amount $X_{BRK}$ substantially corresponding to the controlled variable of braking force control) is set to a relatively higher level than that calculated or retrieved in case of the comparatively small lane-deviation estimated amount $X_{LD}$. Exactly speaking, the ratio ($H_{BRK}/H_{STR}=X_{BRK}/X_{STR}$) of braking-force-control allotted ratio $H_{BRK}$ (braking-force-control allotted amount $X_{BRK}$) to steering-control allotted ratio $H_{STR}$ (steering-control allotted amount $X_{STR}$) is set to a relatively higher value in comparison with the ratio ($H_{BRK}/H_{STR}=X_{BRK}/X_{STR}$) derived in case of the comparatively small lane-deviation estimated amount $X_{LD}$. In this manner, in presence of the comparatively great host vehicle's lane deviation, braking force control as well as steering torque control can be highly permitted, thus accurately attaining compensation for the host vehicle's course to the rightward direction for lane deviation avoidance by way of braking force control as well as steering torque control.

As discussed above, according to the second modified LDP apparatus shown in FIGS. 10–11, in presence of the host vehicle's lane-deviation tendency, the controlled variable (substantially corresponding to $X_{STR}$) for steering torque control and the controlled variable (substantially corresponding to $X_{BRK}$) for braking force control can be adjusted and determined based on the host vehicle's lane-deviation estimated amount $X_{LD}$. The summed value ($X_{STR}+X_{BRK}$) of the controlled variable for steering torque control and the controlled variable for braking force control is decreasingly compensated for, as the host vehicle's lane-deviation estimated amount $X_{LD}$ (exactly, the absolute value $|X_{LD}|$ of lane-deviation estimated amount $X_{LD}$) reduces. Additionally, the ratio ($H_{BRK}/H_{STR}=X_{BRK}/X_{STR}$) of braking-force-control allotted ratio $H_{BRK}$ (braking-force-control allotted amount $X_{BRK}$) to steering-control allotted ratio $H_{STR}$ (steering-control allotted amount $X_{STR}$) is set to a relatively lower value, as the host vehicle's lane-deviation estimated amount $X_{LD}$ (exactly, the absolute value $|X_{LD}|$ Of lane-deviation estimated amount $X_{LD}$) reduces. On the contrary, the summed value ($X_{STR}+X_{BRK}$) of the controlled variable for steering torque control and the controlled variable for braking force control is increasingly compensated for, as the host vehicle's lane-deviation estimated amount $X_{LD}$ (exactly, the absolute value $|X_{LD}|$ Of lane-deviation estimated amount $X_{LD}$) increases. Additionally, the ratio ($H_{BRK}/H_{STR}=X_{BRK}/X_{STR}$) of braking-force-control allotted ratio $H_{BRK}$ (braking-force-control allotted amount $X_{BRK}$) to steering-control allotted ratio $H_{STR}$ (steering-control allotted amount $X_{STR}$) is set to a relatively higher value, as the host vehicle's lane-deviation estimated amount $X_{LD}$ (exactly, the absolute value $|X_{LD}|$ of lane-deviation estimated amount $X_{LD}$) increases. Therefore, in presence of a small degree of the host vehicle's lane deviation (a small lane-deviation estimated amount $X_{LD}$), it is possible to effectively suppress braking force control for LDA and thus to prevent a feeling of uncomfortable vehicle deceleration from being given to the driver. In presence of a large degree of the host vehicle's lane deviation (a large lane-deviation estimated amount $X_{LD}$), it is possible to permit and enable adequate braking force control as well as adequate steering torque control, and also to effectively enhance the LDP performance.

Figure 12:
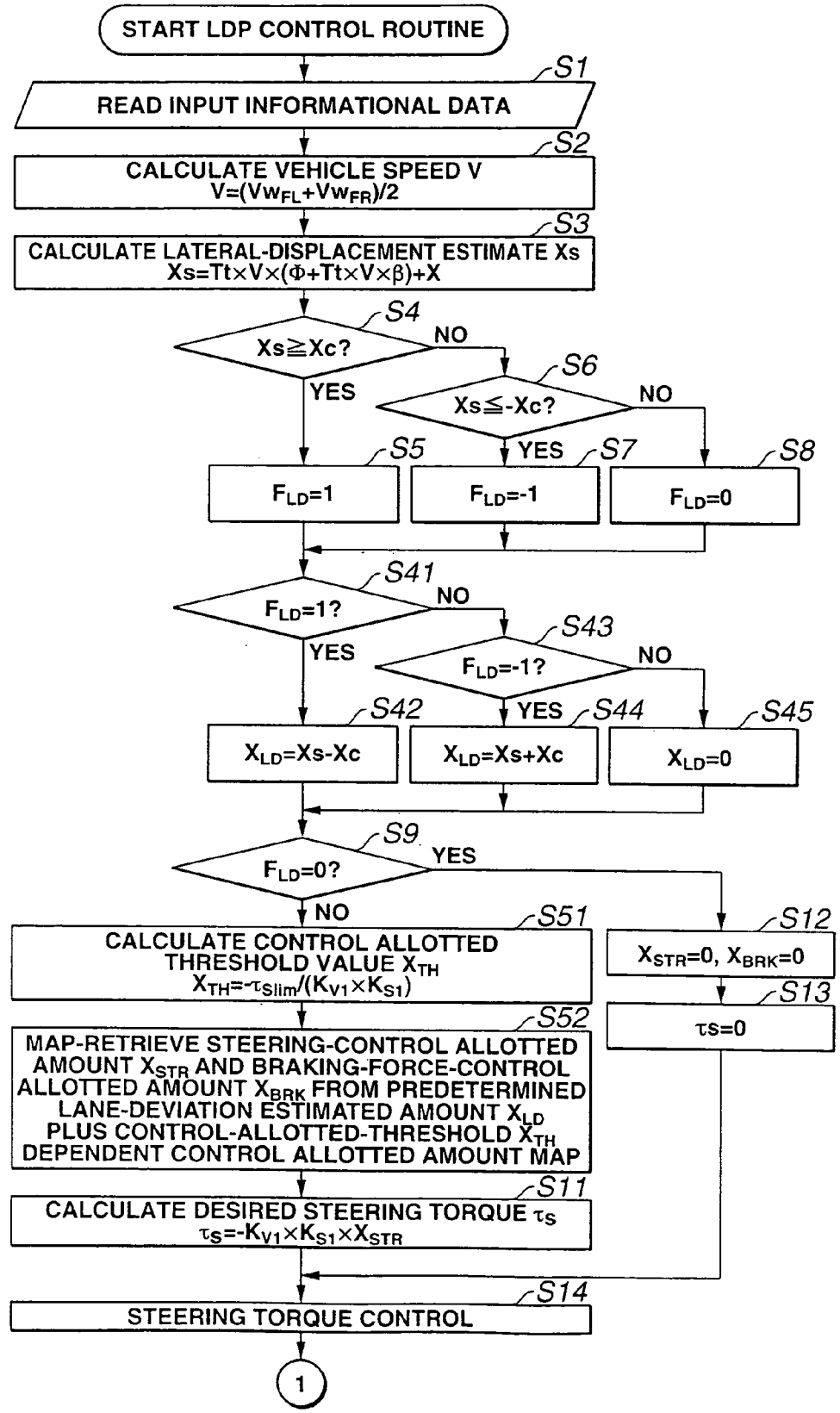
FIG. 12 is a flow chart showing a former half of the LDP control routine executed within an ECU incorporated in a third modified LDP apparatus.

Referring now to FIG. 12, there is shown the former half of the LDP control routine executed within the ECU incorporated in the third modified LDP apparatus. As hereunder described in detail in reference to FIGS. 12 and 13A–13C, in the third modified LDP apparatus shown in FIG. 12, steering-control allotted ratio $H_{STR}$ (steering-control allotted amount $X_{STR}$) and braking-force-control allotted ratio $H_{BRK}$ (braking-force-control allotted amount $X_{BRK}$) are determined depending on a control allotted threshold value $X_{TH}$ (described later) as well as lateral-displacement estimate Xs (=Tt×V×(Φ+Tt×V×β)+X, in other words, lane-deviation estimated amount $X_{LD}$). As described later, when the absolute value $|X_{LD}|$ of lane-deviation estimated amount $X_{LD}$ is less than or equal to control allotted threshold value $X_{TH}$, that is, in case of $|X_{LD}|\leq X_{TH}$, lane deviation prevention (LDP) control is achieved by way of only the steering torque control, but braking force control is inhibited. Conversely when the absolute value $|X_{LD}|$ of lane-deviation estimated amount $X_{LD}$ is greater than control allotted threshold value $X_{TH}$, that is, in case of $|X_{LD}|>X_{TH}$, the LDP control is achieved by way of both of (i) steering torque control based on steering-control allotted ratio $H_{STR}$ (steering-control allotted amount $X_{STR}$ set to control allotted threshold value $X_{TH}$) and (ii) braking force control based on braking-force-control allotted ratio $H_{BRK}$ (braking-force-control allotted amount $X_{BRK}$ set to a difference between lane-deviation estimated amount $X_{LD}$ and control allotted threshold value $X_{TH}$). As explained later by reference to the flow chart of FIG. 12 and the characteristic maps of FIGS. 13A–13C, actually, in setting or determining braking-force-control allotted amount $X_{BRK}$ to the difference between lane-deviation estimated amount $X_{LD}$ and control allotted threshold value $X_{TH}$, in case of the positive lane-deviation estimated amount $X_{LD}$, braking-force-control allotted amount $X_{BRK}$ is set to a difference ($X_{LD}-X_{TH}$) between lane-deviation estimated amount $X_{LD}$ and control allotted threshold value $X_{TH}$. Conversely in case of the negative lane-deviation estimated amount $X_{LD}$, braking-force-control allotted amount $X_{BRK}$ is set to a difference ($X_{LD}+X_{TH}$) between lane-deviation estimated amount $X_{LD}$ and control allotted threshold value $X_{TH}$. As appreciated from comparison between the routines shown in FIGS. 10 and 12, the third modified LDP apparatus shown in FIG. 12 is similar to the second modified LDP apparatus shown in FIGS. 10–11, except that step S51 is added just after step S9, and additionally step S46 of FIG. 10 is replaced with step S52 utilizing the predetermined lane-deviation estimated amount $X_{LD}$ plus controlled-allotted-threshold $X_{TH}$ dependent control-allotted-amount characteristic map shown in FIG. 13A. In a similar manner to the second modified LDP apparatus shown in FIG. 10, in the third modified LDP apparatus shown in FIG. 12, under a prerequisite defined by the equality $X_{LD}=X_{STR}+X_{BRK}$, steering-control allotted ratio $H_{STR}$ (steering-control allotted amount $X_{STR}$) and braking-force-control allotted ratio $H_{BRK}$ (braking-force-control allotted amount $X_{BRK}$) are determined depending on lateral-displacement estimate Xs (=Tt×V×(Φ+Tt×V×β)+X). Thus, the same step numbers used to designate steps in the second modified routine shown in FIG. 10 will be applied to the corresponding step numbers used in the third modified routine shown in FIG. 12, for the purpose of comparison of the two different interrupt routines. Steps S51–S52 will be hereinafter described in detail with reference to the accompanying drawings, while detailed description of steps S1–S9, S11–S14, and S41–S45 will be omitted because the above description thereon seems to be self-explanatory.

When the answer to step S9 is negative (NO), that is, in case of $F_{LD}\neq 0$, the routine proceeds from step S9 to step S51 of FIG. 12.

At step S51, control allotted threshold value $X_{TH}$ is arithmetically calculated from the following expression (28)

and variably adjusted or determined depending on host vehicle speed V.

$$X_{TH}=-\tau slim/(K_{V1} \times K_{S1}) \qquad (28)$$

where τslim denotes a preset steering-torque value, $K_{V1}$ denotes a constant that is determined by specifications of the host vehicle, and $K_{S1}$ denotes a variable gain that is determined depending on host vehicle speed V. As can be appreciated from comparison between the two expressions (5) and (28), control allotted threshold value $X_{TH}$ is obtained by way of inverse-operation for the previously-discussed expression (5).

Figure 13A:
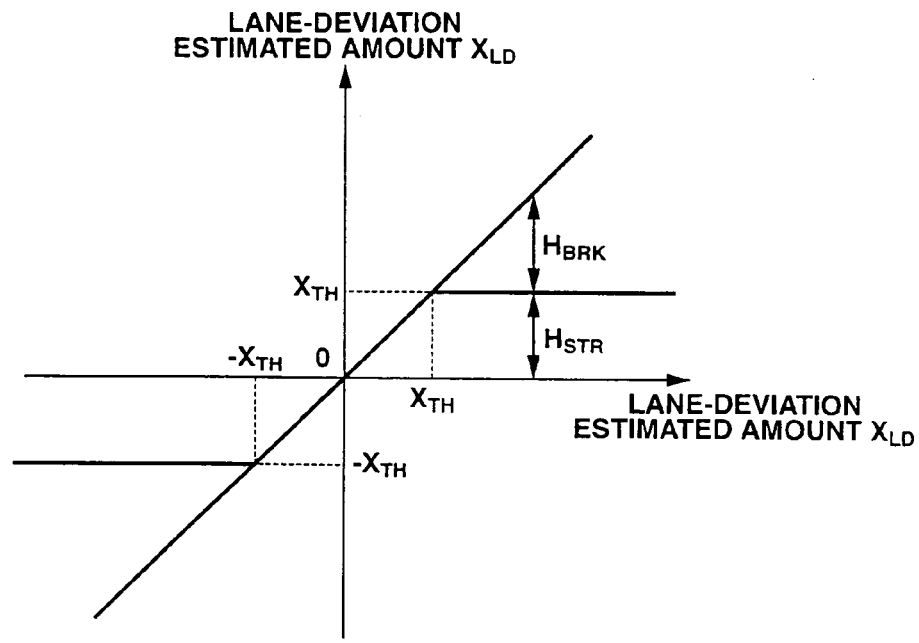
FIG. 13A is a preprogrammed lane-deviation estimated amount $X_{LD}$ versus steering-control allotted amount $X_{STR}$ (steering-control allotted rate $H_{STR}$) versus braking-force-control allotted amount $X_{BRK}$ (braking-force-control allotted rate $H_{BRK}$) characteristic map stored in a memory of the ECU of the third modified LDP apparatus of FIG. 12.
Figure 13B:
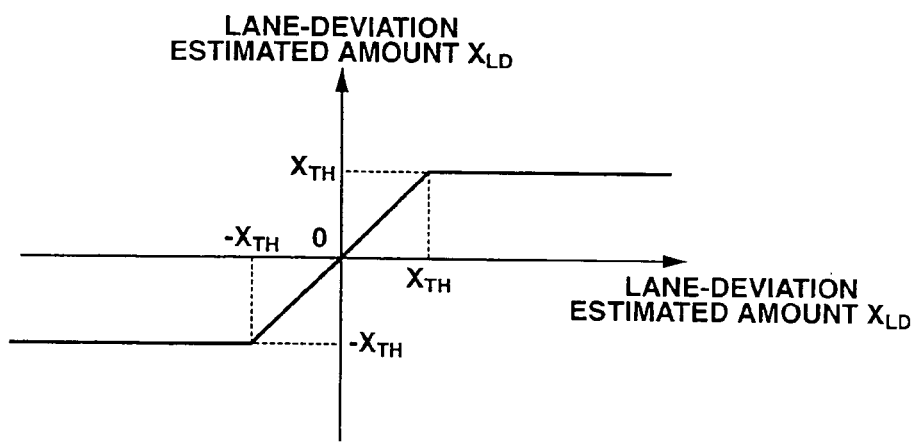
FIG. 13B is a preprogrammed lane-deviation estimated amount $X_{LD}$ versus steering-control allotted amount $X_{STR}$ characteristic map stored in a memory of the ECU of the third modified LDP apparatus of FIG. 12.
Figure 13C:
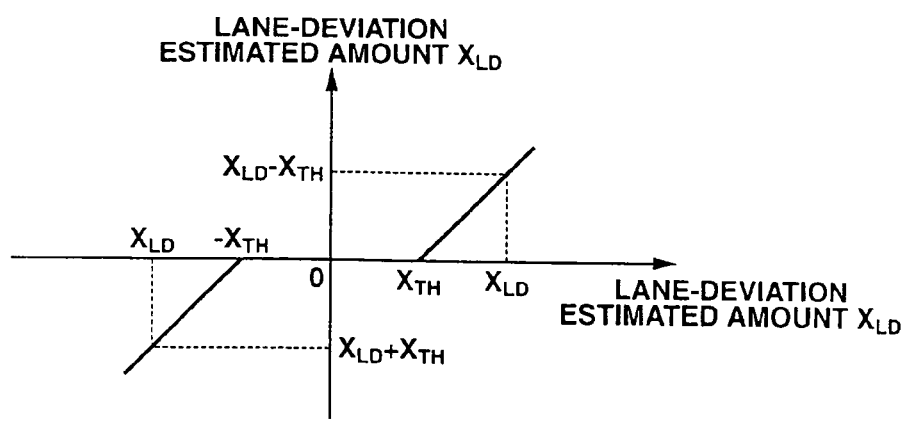
FIG. 13C is a preprogrammed lane-deviation estimated amount $X_{LD}$ versus braking-force-control allotted amount $X_{BRK}$ characteristic map stored in the memory of the ECU of the third modified LDP apparatus of FIG. 12.

At step S52, steering-control allotted ratio $H_{STR}$ (steering-control allotted amount $X_{STR}$) is determined or retrieved based on both of lane-deviation estimated amount $X_{LD}$ and controlled-allotted-threshold $X_{TH}$, from the predetermined lane-deviation estimated amount $X_{LD}$ plus controlled-allotted-threshold $X_{TH}$ dependent control-allotted-amount characteristic map shown in FIG. 13A (or the predetermined lane-deviation estimated amount $X_{LD}$ versus steering-control allotted amount $X_{STR}$ characteristic map of FIG. 13B), while braking-force-control allotted ratio $H_{BRK}$ (braking-force-control allotted amount $X_{BRK}$) is determined or retrieved based on both of lane-deviation estimated amount $X_{LD}$ and controlled-allotted-threshold $X_{TH}$, from the predetermined lane-deviation estimated amount $X_{LD}$ plus controlled-allotted-threshold $X_{TH}$ dependent control-allotted-amount characteristic map shown in FIG. 13A (or the predetermined lane-deviation estimated amount $X_{LD}$ versus braking-force-control allotted amount $X_{BRK}$ characteristic map of FIG. 13C).

As can be seen from the predetermined lane-deviation estimated amount $X_{LD}$ plus controlled-allotted-threshold $X_{TH}$ dependent control-allotted-amount characteristic map shown in FIG. 13A, when the absolute value $|X_{LD}|$ of lane-deviation estimated amount $X_{LD}$ is less than or equal to control allotted threshold value $X_{TH}$, that is, in case of $|X_{LD}| \leq X_{TH}$, braking-force-control allotted amount $X_{BRK}$ is set to "0", that is, $X_{BRK}=0$, whereas steering-control allotted amount $X_{STR}$ is set to "$X_{LD}$", because of $X_{LD}=X_{STR}+X_{BRK}=X_{STR}+0=X_{STR}$. Conversely when the absolute value $|X_{LD}|$ of lane-deviation estimated amount $X_{LD}$ is greater than control allotted threshold value $X_{TH}$, that is, in case of $|X_{LD}|>X_{TH}$, control allotted threshold value $X_{TH}$ is set as steering-control allotted amount $X_{STR}$, whereas the difference between lane-deviation estimated amount $X_{LD}$ and control allotted threshold value $X_{TH}$ is set as braking-force-control allotted amount $X_{BRK}$.

FIG. 13B is a preprogrammed $X_{LD}$–$X_{STR}$ characteristic map that is obtained by extracting only the relationship between lane-deviation estimated amount $X_{LD}$ and steering-control allotted ratio $H_{STR}$ (steering-control allotted amount $X_{STR}$) from the characteristic map of FIG. 13A. That is, steering-control allotted amount $X_{STR}$ can be computed or retrieved from the preprogrammed $X_{LD}$–$X_{STR}$ characteristic map of FIG. 13B. On the other hand, FIG. 13C is a preprogrammed $X_{LD}$–$X_{BRK}$ characteristic map that is obtained by extracting only the relationship between lane-deviation estimated amount $X_{LD}$ and braking-force-control allotted ratio $H_{BRK}$ (braking-force-control allotted amount $X_{BRK}$) from the characteristic map of FIG. 13A. That is, braking-force-control allotted amount $X_{BRK}$ can be computed or retrieved from the preprogrammed $X_{LD}$–$X_{BRK}$ characteristic map of FIG. 13C.

Therefore, suppose that the host vehicle tends to slightly deviate from the central axis (the reference axis) of the current driving lane to the left and there is a comparatively small host vehicle's lane-deviation tendency (i.e., $|X_{LD}| \leq X_{TH}$) that lane-deviation estimated amount $X_{LD}$ is less than or equal to control allotted threshold value $X_{TH}$. In such a case, that is, there is a comparatively small host vehicle's lane-deviation tendency ($|X_{LD}| \leq X_{TH}$) to the left, the LDP control routine of FIG. 12 flows from step S4 through steps S5, S41, S42, S9, and S51 to step S52. At step S42, lane-deviation estimated amount $X_{LD}$ is calculated as a comparatively small positive value, because of the comparatively small positive lateral-displacement estimate Xs (=Tt×V×(Φ+Tt×V×β)+X). Owing to the comparatively small positive lane-deviation estimated amount $X_{LD}$ calculated and the comparison result (i.e., $|X_{LD}| \leq X_{TH}$) between lane-deviation estimated amount $X_{LD}$ and control allotted threshold value $X_{TH}$, steering-control allotted amount $X_{STR}$ (substantially corresponding to the controlled variable of steering torque control) is calculated in such a manner as to be equal to lane-deviation estimated amount $X_{LD}$, that is, $X_{STR}=X_{LD}$, from preprogrammed $X_{LD}$–$X_{STR}$ characteristic map of FIG. 13B. On the other hand, braking-force-control allotted amount $X_{BRK}$ (substantially corresponding to the controlled variable of braking force control) is calculated in such a manner as to be equal to "0", that is, $X_{BRK}=0$, from preprogrammed $X_{LD}$–$X_{BRK}$ characteristic map of FIG. 13C. Thus, in case of the host vehicle with a comparatively small host vehicle's leftward lane-deviation tendency (i.e., $X_{LD} \leq X_{TH}$) that the positive lane-deviation estimated amount $X_{LD}$ is less than or equal to control allotted threshold value $X_{TH}$, it is possible to suitably achieve compensation for the host vehicle's course to the rightward direction for lane deviation avoidance (LDA) only by steering torque control, while inhibiting braking force control for LDA.

On the contrary, suppose that the host vehicle tends to remarkably deviate from the central axis of the current driving lane to the left and there is a comparatively large host vehicle's lane-deviation tendency (i.e., $|X_{LD}|>X_{TH}$), more exactly, $X_{LD}>X_{TH}$) that the positive lane-deviation estimated amount $X_{LD}$ is greater than control allotted threshold value $X_{TH}$. In such a case, that is, there is a comparatively large host vehicle's lane-deviation tendency ($|X_{LD}|>X_{TH}$) to the left, the LDP control routine of FIG. 12 flows from step S4 through steps S5, S41, S42, S9, and S51 to step S52 At step S42, lane-deviation estimated amount $X_{LD}$ is calculated as a comparatively large positive value, because of the comparatively large lateral-displacement estimate Xs (=Tt×V×(Φ+Tt×V×β)+X). Owing to the comparatively large positive lane-deviation estimated amount $X_{LD}$ calculated and the comparison result (i.e., $|X_{LD}|>X_{TH}$) between lane-deviation estimated amount $X_{LD}$ and control allotted threshold value $X_{TH}$, steering-control allotted amount $X_{STR}$ (substantially corresponding to the controlled variable of steering torque control) is calculated in such a manner as to be equal to or fixed to control allotted threshold value $X_{TH}$, that is, $X_{STR}=X_{TH}$, from preprogrammed $X_{LD}$–$X_{STR}$ characteristic map of FIG. 13B. On the other hand, braking-force-control allotted amount $X_{BRK}$ (substantially corresponding to the controlled variable of braking force control) is calculated in such a manner as to be equal to the difference ($X_{LD}$–$X_{TH}$) between lane-deviation estimated amount (exactly, the positive lane-deviation estimated amount) $X_{LD}$ and control allotted threshold value $X_{TH}$, that is, $X_{BRK}=X_{LD}-X_{TH}$, from preprogrammed $X_{LD}$–$X_{BRK}$ characteristic map of FIG. 13C. Thus, in case of the host vehicle with a comparatively large host vehicle's leftward lane-deviation tendency (i.e., $X_{LD}>X_{TH}$) that the positive lane-deviation estimated amount $X_{LD}$ is greater than control allotted threshold value $X_{TH}$, both of braking force control and steering torque control can be permitted, thus accurately attaining compensation for the host vehicle's course to the rightward direction for lane deviation avoidance by way of combined lane deviation prevention (LDP) control actions of braking force control and steering torque control.

Conversely suppose that the host vehicle tends to remarkably deviate from the central axis of the current driving lane to the right and there is a comparatively large host vehicle's lane-deviation tendency (i.e., $|X_{LD}|>X_{TH}$, more exactly, $X_{LD}<-X_{TH}$) that the negative lane-deviation estimated amount $X_{LD}$ is less than the negative value $-X_{TH}$ of control allotted threshold value $X_{TH}$. In such a case, that is, there is a comparatively large host vehicle's lane-deviation tendency ($X_{LD}<-X_{TH}$) to the right, the LDP control routine of FIG. 12 flows from step S4 through steps S6, S7, S41, S43, S44, S9, and S51 to step S52. At step S44, lane-deviation estimated amount $X_{LD}$ is calculated as a comparatively large negative value, because of the comparatively large negative lateral-displacement estimate Xs ($=T t \times V \times (\Phi + T t \times V \times \beta) + X$). Owing to the comparatively large negative lane-deviation estimated amount $X_{LD}$ calculated and the comparison result (i.e., $X_{LD}<-X_{TH}$) between the negative lane-deviation estimated amount $X_{LD}$ and the negative value $-X_{TH}$ of control allotted threshold value $X_{TH}$, steering-control allotted amount $X_{STR}$ (substantially corresponding to the controlled variable of steering torque control) is calculated in such a manner as to be equal to or fixed to the negative value $-X_{TH}$ of control allotted threshold value $X_{TH}$, that is, $X_{STR}=X_{TH}$, from preprogrammed $X_{LD}-X_{STR}$ characteristic map of FIG. 13B. On the other hand, braking-force-control allotted amount $X_{BRK}$ (substantially corresponding to the controlled variable of braking force control) is calculated in such a manner as to be equal to the difference $(X_{LD}+X_{TH})$ between lane-deviation estimated amount (exactly, the negative lane-deviation estimated amount) $X_{LD}$ and control allotted threshold value $X_{TH}$, that is, $X_{BRK}=X_{LD}+X_{TH}$, from preprogrammed $X_{LD}-X_{BRK}$ characteristic map of FIG. 13C. Thus, in case of the host vehicle with a comparatively large host vehicle's rightward lane-deviation tendency (i.e., $X_{LD}<-X_{TH}$) that the negative lane-deviation estimated amount $X_{LD}$ is less than the negative value $-X_{TH}$ of control allotted threshold value $X_{TH}$, both of braking force control and steering torque control can be permitted, thus accurately attaining compensation for the host vehicle's course to the leftward direction for lane deviation avoidance by way of combined LDP control actions of braking force control and steering torque control.

As discussed above, according to the third modified LDP apparatus shown in FIGS. 12–13C, in presence of the host vehicle's lane-deviation tendency, the controlled variable (substantially corresponding to $X_{STR}$) for steering torque control and the controlled variable (substantially corresponding to $X_{BRK}$) for braking force control can be adjusted and determined based on the host vehicle's lane-deviation estimated amount $X_{LD}$. The summed value $(X_{STR}+X_{BRK})$ of the controlled variable for steering torque control and the controlled variable for braking force control is decreasingly compensated for, as the host vehicle's lane-deviation estimated amount $X_{LD}$ (exactly, the absolute value $|X_{LD}|$ of lane-deviation estimated amount $X_{LD}$) reduces. Additionally, the controlled variable for braking force control is set to "0" and thus braking force control for LDA is inhibited, in case that the absolute value $|X_{LD}|$ of lane-deviation estimated amount $X_{LD}$ is less than or equal to control allotted threshold value $X_{TH}$. On the contrary, the summed value $(X_{STR}+X_{BRK})$ of the controlled variable for steering torque control and the controlled variable for braking force control is increasingly compensated for, as the host vehicle's lane-deviation estimated amount $X_{LD}$(exactly, the absolute value $|X_{LD}|$ of lane-deviation estimated amount $X_{LD}$) increases. Additionally, the controlled variable for braking force control is increasingly compensated for and thus braking force control for LDA as well as steering torque control is permitted, in case that the absolute value $|X_{LD}|$ of lane-deviation estimated amount $X_{LD}$ is greater than control allotted threshold value $X_{TH}$. Additionally, the ratio $(H_{BRK}/H_{STR}=X_{BRK}/X_{STR})$ of braking-force-control allotted ratio $H_{BRK}$ (braking-force-control allotted amount $X_{BRK}$) to steering-control allotted ratio $H_{STR}$ (steering-control allotted amount $X_{STR}$) is set to a relatively higher value, as the absolute value $|X_{LD}|$ of lane-deviation estimated amount $X_{LD}$) increases under the condition where the absolute value $|X_{LD}|$ of lane-deviation estimated amount $X_{LD}$ is greater than control allotted threshold value $X_{TH}$. Therefore, in presence of a small degree of the host vehicle's lane deviation (a small lane-deviation estimated amount $X_{LD}$), it is possible to inhibit braking force control for LDA and thus to certainly prevent a feeling of uncomfortable vehicle deceleration from being given to the driver. In presence of a large degree of the host vehicle's lane deviation (a large lane-deviation estimated amount $X_{LD}$), it is possible to permit and enable adequate braking force control as well as adequate steering torque control, and also to effectively enhance the LDP performance.

Figure 14:
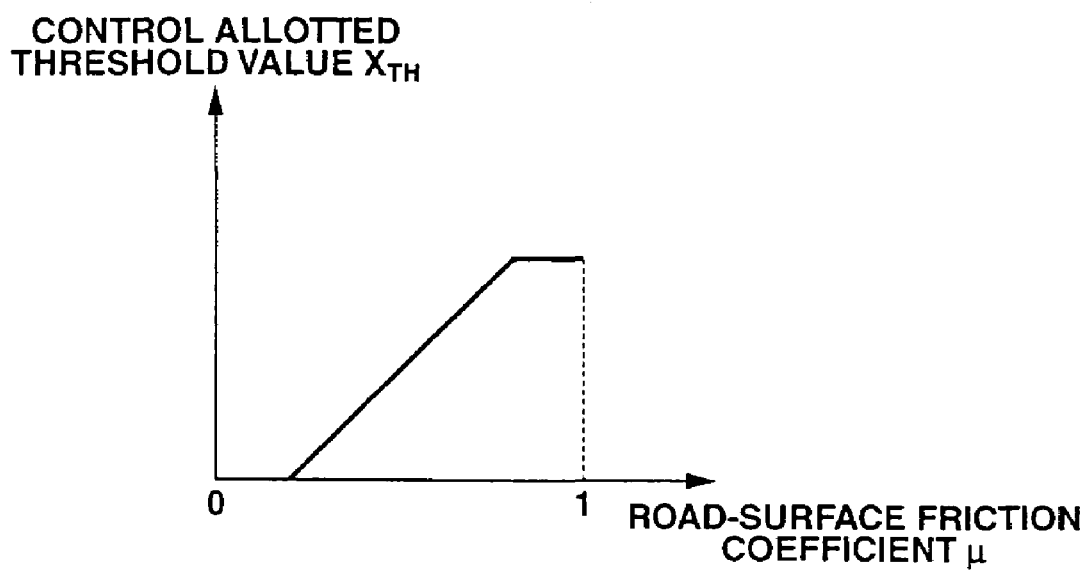
FIG. 14 is a preprogrammed control allotted threshold value $X_{TH}$ versus road-surface friction coefficient $\mu$ characteristic map.

In the previously-noted third modified LDP apparatus shown in FIG. 12, at step S51 control allotted threshold value $X_{TH}$ is arithmetically calculated based on variable gain $K_{S1}$, which is determined depending on host vehicle speed V, from the expression (28), that is, $X_{TH}=-\tau slim/(K_{V1} \times K_{S1})$ In lieu thereof, control allotted threshold value $X_{TH}$ may be calculated or retrieved based on a road-surface friction coefficient $\mu$ from a predetermined control allotted threshold value $X_{TH}$ versus road-surface friction coefficient $\mu$ characteristic map shown in FIG. 14. The road-surface friction coefficient $\mu$ is usually calculated or estimated based on a tire slippage rate or a tire slip ratio. The tire slip ratio itself can be generally calculated as a ratio of a difference $\{|V-Vwj|/V\}$ between host vehicle speed V and a wheel speed Vwj at each road wheel to host vehicle speed V. As can be seen from the predetermined control allotted threshold value $X_{TH}$ versus road-surface friction coefficient $\mu$ characteristic map shown in FIG. 14, control allotted threshold value $X_{TH}$ is set to "0" below a predetermined low friction-coefficient threshold value $\mu_{low}$, and set to "1" above a predetermined high friction-coefficient threshold value $\mu_{high}$. Within an intermediate friction-coefficient range from predetermined low friction-coefficient threshold value $\mu_{low}$ to predetermined high friction-coefficient threshold value $\mu_{high}$, control allotted threshold value $X_{TH}$ is increasingly compensated for and increases in proportion to an increase in road-surface friction coefficient $\mu$. Therefore, in case of the use of the predetermined $X_{TH}-\mu$ characteristic map shown in FIG. 14, control allotted threshold value $X_{TH}$ is set to a lower value, as road-surface friction coefficient $\mu$ decreases. Thus, for the same degree of the host vehicle's lane deviation, i.e., for the same lane-deviation estimated amount $X_{LD}$, braking-force-control allotted amount $X_{BRK}$ suitable to a low-$\mu$ road can be calculated as a relatively greater value in comparison with braking-force-control allotted amount $X_{BRK}$ suitable to a high-$\mu$ road. Therefore, when there is a host vehicle's lane-deviation tendency during driving on low-$\mu$ roads, owing to braking-force-control allotted amount $X_{BRK}$ set to a relatively greater value for the same degree of the host vehicle's lane deviation (for the same lane-deviation estimated amount $X_{LD}$), it is possible to generate a comparatively great braking force during LDP control, thus certainly avoiding the host vehicle from deviating from the current driving lane.

In the LDP apparatus of the embodiment shown in FIGS. 1–3, the 1$^{st}$ modified LDP apparatus shown in FIG. 7, the 2$^{nd}$ modified LDP apparatus shown in FIG. 10, and the 3$^{rd}$ modified LDP apparatus shown in FIG. 12, when lane deviation prevention (LDP) control is initiated in there is a host vehicle's lane-deviation tendency and braking force control as well as steering torque control is permitted, a desired value (desired yaw moment Ms) of yaw moment to be exerted on the host vehicle for lane deviation avoidance (LDA) is produced by controlling, adjusting or regulating only the desired wheel-brake cylinder pressures $Ps_{FL}$, $Ps_{FR}$, $Ps_{RL}$ and $Ps_{RR}$ of road wheels 5FL–5RR via hydraulic modulator 7. In lieu thereof, in order to a desired value (desired yaw moment Ms) of yaw moment to be exerted on the host vehicle for lane deviation avoidance (LDA) when braking force control and steering torque control are both permitted, driving force control may be further added to the braking force control in an ACC vehicle employing a driving force control unit, which is designed to individually control the driving force (driving torque) transmitted to drive road wheels (rear drive wheels in a rear-wheel-drive vehicle), for example, driving torque control unit 12 shown in FIG. 1.

The LDP apparatus of the embodiment of FIGS. 1–3 is exemplified in an ACC system equipped rear-wheel-drive vehicle. The LDP apparatus of the embodiment may be applied to an ACC equipped front-wheel-drive vehicle. In such a case, host vehicle speed V has to be calculated as a simple average value $(Vw_{RL}+Vw_{RR})/2$ of rear-left and rear-right wheel speeds $Vw_{RL}$ and $Vw_{RR}$ (corresponding to wheel speeds of driven road wheels 5RL and 5RR), from the expression $V=(Vw_{RL}+Vw_{RR})/2$.

The entire contents of Japanese Patent Application No. 2003-395587 (filed Nov. 26, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive lane deviation prevention apparatus capable of executing lane deviation prevention (LDP) control by which a host vehicle is avoided from deviating from a driving lane, the LDP apparatus comprising:
   a traveling-state detector that detects a traveling state of the host vehicle;
   a steering actuator that adjusts a steering torque applied to a steering system;
   braking force actuators that adjust braking forces applied to respective road wheels for adjusting a yaw moment exerted on the host vehicle; and
   a control unit being configured to be electronically connected to the steering actuator, the braking force actuators and the traveling-state detector, for controlling the steering actuator and the braking force actuators in response to signals from the traveling-state detector for lane deviation avoidance purposes; the control unit comprising
   (a) an LDP control allotted amount calculation section that determines, responsively to the host vehicle's traveling state, whether there is a tendency for the host vehicle to deviate from the driving lane, and calculates, responsively to the host vehicle's traveling state, a steering-control allotted amount for the LDP control and a braking-force-control allotted amount for the LDP control, in presence of the host vehicle's lane-deviation tendency from the driving lane;
   (b) a steering-control controlled variable calculation section that calculates a steering-torque-control controlled variable based on the steering-control allotted amount for producing the steering torque in a direction that the host vehicle's lane-deviation tendency is avoided;
   (c) a steering torque control section that controls the steering torque responsively to the steering-torque-control controlled variable;
   (d) a desired yaw-moment calculation section that calculates a desired yaw moment based on the braking-force-control allotted amount for producing the yaw moment in the direction that the host vehicle's lane-deviation tendency is avoided;
   (e) a braking-force-control controlled variable calculation section that calculates, based on the desired yaw moment, braking-force-control controlled variables for the respective road wheels; and
   (f) a braking force control section that controls the braking forces applied to the respective road wheels responsively to the braking-force-control controlled variables.

2. The automotive lane deviation prevention apparatus as claimed in claim 1, wherein:
   the traveling-state detector detects a turning state of the host vehicle; and
   the LDP control allotted amount calculation section calculates, based on the turning state of the host vehicle, the steering-control allotted amount and the braking-force-control allotted amount.

3. The automotive lane deviation prevention apparatus as claimed in claim 2, wherein:
   the traveling-state detector detects a host vehicle's driving-lane curvature as the turning state; and
   the LDP control allotted amount calculation section calculates, based on the host vehicle's driving-lane curvature, the steering-control allotted amount and the braking-force-control allotted amount.

4. The automotive lane deviation prevention apparatus as claimed in claim 3, wherein:
   the traveling-state detector comprises a driving lane detector that detects the host vehicle's driving lane used as input informational data regarding the host vehicle's driving-lane curvature.

5. The automotive lane deviation prevention apparatus as claimed in claim 3, wherein:
   the traveling-state detector comprises a navigation system whose map data are used as input informational data regarding the host vehicle's driving-lane curvature.

6. The automotive lane deviation prevention apparatus as claimed in claim 3, wherein:
   the traveling-state detector comprises an automated-highway infrastructure having an on-road network whose road data are extracted by mutual communication between the host vehicle and the on-road network and used as input informational data regarding the host vehicle's driving-lane curvature.

7. The automotive lane deviation prevention apparatus as claimed in claim 3, wherein:
   the traveling-state detector calculates a host vehicle's turning curvature based on a host vehicle speed and a steer angle; and the LDP control allotted amount calculation section calculates, based on the host vehicle's turning curvature, the steering-control allotted amount and the braking-force-control allotted amount.

8. The automotive lane deviation prevention apparatus as claimed in claim 2, wherein:
the traveling-state detector detects either one of a lateral acceleration exerted on the host vehicle, a yaw rate resulting from the yaw moment acting on the host vehicle, and a steer angle; and
the LDP control allotted amount calculation section calculates, based on either one of the lateral acceleration, the yaw rate, and the steer angle, the steering-control allotted amount and the braking-force-control allotted amount.

9. The automotive lane deviation prevention apparatus as claimed in claim 2, wherein:
the LDP control allotted amount calculation section increasingly compensates for the steering-control allotted amount, as the turning state of the host vehicle changes from a steep turning state to a gentle turning state; and
the LDP control allotted amount calculation section decreasingly compensates for the braking-force-control allotted amount, as the turning state of the host vehicle changes from the gentle turning state to the steep turning state.

10. The automotive lane deviation prevention apparatus as claimed in claim 1, wherein:
the traveling-state detector comprises a lane-deviation direction detection section that detects whether the host vehicle tends to deviate toward an outside of a turn or toward an inside of a turn; and
the LDP control allotted amount calculation section calculates the steering-control allotted amount and the braking-force-control allotted amount, depending on whether the host vehicle tends to deviate toward the outside of a turn or toward the inside of a turn.

11. The automotive lane deviation prevention apparatus as claimed in claim 1, wherein:
the traveling-state detector comprises a lane-deviation amount calculation section that calculates a lane-deviation estimated amount; and
the LDP control allotted amount calculation section calculates, based on the lane-deviation estimated amount, the steering-control allotted amount and the braking-force-control allotted amount.

12. The automotive lane deviation prevention apparatus as claimed in claim 11, wherein:
the LDP control allotted amount calculation section decreasingly compensates for a summed value of the steering-control allotted amount and the braking-force-control allotted amount, as an absolute value of the lane-deviation estimated amount reduces; and
the LDP control allotted amount calculation section increasingly compensates for a ratio of the steering-control allotted amount to the braking-force-control allotted amount, as the absolute value of the lane-deviation estimated amount reduces.

13. The automotive lane deviation prevention apparatus as claimed in claim 11, wherein:
the lane-deviation estimated amount is calculated based on input information concerning a host vehicle's yaw angle, a host vehicle's lateral displacement from a central axis of the host vehicle's driving lane, and a host vehicle's driving-lane curvature.

14. The automotive lane deviation prevention apparatus as claimed in claim 11, wherein:
the LDP control allotted amount calculation section sets the braking-force-control allotted amount to zero and sets the steering-control allotted amount to the lane-deviation estimated amount under a condition where the absolute value of the lane-deviation estimated amount is less than or equal to a threshold value; and
the LDP control allotted amount calculation section sets the braking-force-control allotted amount to a difference between the lane-deviation estimated amount and the threshold value and sets the steering-control allotted amount to the threshold value under a condition where the absolute value of the lane-deviation estimated amount is greater than the threshold value.

15. The automotive lane deviation prevention apparatus as claimed in claim 14, wherein:
the traveling-state detector detects a road-surface friction coefficient of the driving lane of the host vehicle; and
the LDP control allotted amount calculation section calculates, based on the road-surface friction coefficient, the steering-control allotted amount and the braking-force-control allotted amount.

16. The automotive lane deviation prevention apparatus as claimed in claim 15, wherein:
the LDP control allotted amount calculation section increasingly compensates for the steering-control allotted amount, as the road-surface friction coefficient changes from a low friction coefficient to a high friction coefficient; and
the LDP control allotted amount calculation section increasingly compensates for the braking-force-control allotted amount, as the road-surface friction coefficient changes from the high friction coefficient to the low friction coefficient.

17. The automotive lane deviation prevention apparatus as claimed in claim 15, wherein:
the threshold value is decreasingly compensated for, as the road-surface friction coefficient changes from a high friction coefficient to a low friction coefficient.

18. An automotive lane deviation prevention apparatus capable of executing lane deviation prevention (LDP) control by which a host vehicle is avoided from deviating from a driving lane, the LDP apparatus comprising:
a traveling-state detector that detects a traveling state of the host vehicle;
a steering actuator that adjusts a steering torque applied to a steering system;
braking force actuators that adjust braking forces applied to respective road wheels for adjusting a yaw moment exerted on the host vehicle; and
a control unit being configured to be electronically connected to the steering actuator, the braking force actuators and the traveling-state detector, for controlling the steering actuator and the braking force actuators in response to signals from the traveling-state detector for lane deviation avoidance purposes; the control unit comprising
(a) lane-deviation decision means for determining, responsively to the host vehicle's traveling state, whether there is a tendency for the host vehicle to deviate from the driving lane;
(b) lane-deviation-avoidance allotted amount calculation means for calculating, responsively to the host vehicle's traveling state, a steering-control allotted amount for the LDP control and a braking-force-control allotted amount for the LDP control, in presence of the host vehicle's lane-deviation tendency from the driving lane;
(c) steering-control controlled variable calculation section for calculating a steering-torque-control controlled variable based on the steering-control allotted amount for producing the steering torque in a direction that the host vehicle's lane-deviation tendency is avoided;
(d) steering torque control means for controlling the steering torque responsively to the steering-torque-control controlled variable;
(e) desired yaw-moment calculation means for calculating a desired yaw moment based on the braking-force-control allotted amount for producing the yaw moment in the direction that the host vehicle's lane-deviation tendency is avoided;
(f) braking-force-control controlled variable calculation means for calculating, based on the desired yaw moment, braking-force-control controlled variables for the respective road wheels; and
(g) braking force control means for controlling the braking forces applied to the respective road wheels responsively to the braking-force-control controlled variables.

19. A method for lane deviation prevention (LDP) control by which a host vehicle is avoided from deviating from a driving lane, the method comprising:
detecting a traveling state of the host vehicle;
determining, responsively to the host vehicle's traveling state, whether there is a tendency for the host vehicle to deviate from the driving lane;
calculating, responsively to the host vehicle's traveling state, a steering-control allotted amount for the LDP control and a braking-force-control allotted amount for the LDP control, in presence of the host vehicle's lane-deviation tendency from the driving lane;
calculating a steering-torque-control controlled variable based on the steering-control allotted amount for producing the steering torque in a direction that the host vehicle's lane-deviation tendency is avoided;
controlling, responsively to the steering-torque-control controlled variable, a steering torque applied to a steering system;
calculating a desired yaw moment based on the braking-force-control allotted amount for producing a yaw moment acting on the host vehicle in the direction that the host vehicle's lane-deviation tendency is avoided;
calculating, based on the desired yaw moment, braking-force-control controlled variables for respective road wheels; and
controlling, responsively to the braking-force-control controlled variables, braking forces applied to the respective road wheels.

* * * * *